(12) United States Patent
Feng et al.

(10) Patent No.: US 11,915,547 B2
(45) Date of Patent: Feb. 27, 2024

(54) LOGISTIC MANAGEMENT OF GAMING SUPPLIES FOR GAMING ESTABLISHMENTS

(71) Applicants: Frank Feng, Las Vegas, NV (US); Daryn Kiely, Henderson, NV (US)

(72) Inventors: Frank Feng, Las Vegas, NV (US); Daryn Kiely, Henderson, NV (US)

(73) Assignee: Empire Technological Group Limited, Las Vegas, NV (US)

( * ) Notice: Subject to any disclaimer, the term of this patent is extended or adjusted under 35 U.S.C. 154(b) by 587 days.

(21) Appl. No.: 15/396,308

(22) Filed: Dec. 30, 2016

(65) Prior Publication Data

US 2018/0190063 A1 Jul. 5, 2018

(51) Int. Cl.
G07F 17/32 (2006.01)
G06Q 10/0875 (2023.01)

(52) U.S. Cl.
CPC ....... G07F 17/322 (2013.01); G06Q 10/0875 (2013.01); G07F 17/3234 (2013.01); G07F 17/3248 (2013.01)

(58) Field of Classification Search
CPC ............... G07F 17/322; G07F 17/3234; G07F 17/3248; G07F 17/3286; G06Q 10/087
USPC .......................................................... 705/29
See application file for complete search history.

(56) References Cited

U.S. PATENT DOCUMENTS

| | | | |
|---|---|---|---|
| 4,814,589 A * | 3/1989 | Storch | G06F 11/14 235/375 |
| 5,510,081 A | 4/1996 | Edwards et al. | |
| 5,735,742 A | 4/1998 | French | |
| D424,068 S | 5/2000 | Takemasa | |
| 6,332,099 B1 | 12/2001 | Heidel | |
| 6,425,817 B1 * | 7/2002 | Momemy | G07D 9/06 453/17 |
| 6,464,584 B2 | 10/2002 | Oliver | |
| 6,530,836 B2 | 3/2003 | Soltys et al. | |
| 6,848,994 B1 | 2/2005 | Knust | |

(Continued)

FOREIGN PATENT DOCUMENTS

WO WO 2017/203142 A1 11/2017

OTHER PUBLICATIONS

Notice of Allowance for U.S. Appl. No. 29/600,225, dated May 15, 2018.

(Continued)

*Primary Examiner* — Luna Champagne

(57) ABSTRACT

Embodiments disclosed herein concern logistic management of gaming supplies for gaming establishments, such as casinos. The logistic management is electronically managed for automated or user-initiated logistic requests for gaming supplies as well as end-to-end monitoring of fulfillment of such requests. The end-to-end monitoring can make use of electronic monitors, electronic notifications and electronic tracking. Consequently, logistic management can efficiently and reliably monitor, deliver and track supplies within a gaming establishment. Additionally or alternatively to managing request for gaming supplies, logistic management can also manage requests, needs or desires for other supplies or services, such as food and beverage services, gaming services, inventory services, entertainment services, customer services, maintenance services, and the like.

21 Claims, 14 Drawing Sheets

(56) References Cited

U.S. PATENT DOCUMENTS

| | | | |
|---|---|---|---|
| 7,018,291 B1 | 3/2006 | Lemke et al. | |
| 7,025,189 B1* | 4/2006 | Petrusan | G07D 7/02 |
| | | | 194/215 |
| 7,201,660 B2* | 4/2007 | Kiely | G07F 17/32 |
| | | | 340/506 |
| 7,351,145 B1 | 4/2008 | Ornstein et al. | |
| 7,559,839 B2 | 7/2009 | Bahar | |
| D628,199 S | 11/2010 | Yukikado et al. | |
| D628,913 S | 12/2010 | Cheng | |
| D641,018 S | 7/2011 | Lee | |
| D647,574 S | 10/2011 | Zhang | |
| 8,157,643 B1* | 4/2012 | Phan | G01G 19/42 |
| | | | 463/25 |
| D669,076 S | 10/2012 | Haller | |
| 8,282,480 B2 | 10/2012 | Wells | |
| 8,430,733 B2 | 4/2013 | Chang et al. | |
| 8,591,306 B1 | 11/2013 | Kearns | |
| D698,353 S | 1/2014 | Choi | |
| 8,814,681 B2 | 8/2014 | Wells et al. | |
| 8,814,706 B2 | 8/2014 | Wells et al. | |
| 8,968,086 B2 | 3/2015 | Wells et al. | |
| D726,295 S | 4/2015 | Kim et al. | |
| 9,147,318 B2 | 9/2015 | Tarantino | |
| 9,165,420 B1 | 10/2015 | Knust | |
| 9,292,996 B2 | 3/2016 | Davis et al. | |
| D761,901 S | 7/2016 | Kim et al. | |
| 9,489,799 B2 | 11/2016 | Saffari et al. | |
| D778,279 S | 2/2017 | Pendse et al. | |
| 9,754,455 B2 | 9/2017 | Tarantino | |
| D811,488 S | 2/2018 | To et al. | |
| 9,940,779 B2 | 4/2018 | To et al. | |
| D824,906 S | 8/2018 | Feng et al. | |
| D826,228 S | 8/2018 | Feng et al. | |
| 2002/0045480 A1 | 4/2002 | Soltys et al. | |
| 2002/0120572 A1* | 8/2002 | Bellucci | G06Q 20/1085 |
| | | | 705/43 |
| 2003/0058372 A1 | 3/2003 | Williams et al. | |
| 2003/0060280 A1 | 3/2003 | Oles | |
| 2003/0089010 A1 | 5/2003 | Wechter et al. | |
| 2004/0033095 A1* | 2/2004 | Saffari | G07F 17/32 |
| | | | 400/120.01 |
| 2005/0026680 A1 | 2/2005 | Gururajan | |
| 2006/0205498 A1 | 9/2006 | Kogo | |
| 2008/0139274 A1 | 6/2008 | Baerlocher | |
| 2008/0261699 A1 | 10/2008 | Topham | |
| 2009/0075725 A1 | 3/2009 | Koyama | |
| 2009/0082079 A1 | 3/2009 | Kuhn | |
| 2009/0098932 A1 | 4/2009 | Longway | |
| 2009/0253478 A1* | 10/2009 | Walker | A63F 3/00157 |
| | | | 463/12 |
| 2010/0093429 A1 | 4/2010 | Hayashi | |
| 2010/0178989 A1 | 7/2010 | Kuhn | |
| 2010/0244380 A1* | 9/2010 | Walker | A63F 3/00157 |
| | | | 273/292 |
| 2010/0291675 A1 | 11/2010 | Pease | |
| 2011/0050602 A1 | 3/2011 | Jeong et al. | |
| 2011/0195775 A1 | 8/2011 | Wells | |
| 2011/0195786 A1 | 8/2011 | Wells | |
| 2011/0195792 A1 | 8/2011 | Wells | |
| 2012/0094750 A1 | 4/2012 | Kuo | |
| 2012/0208622 A1 | 8/2012 | Delaney | |
| 2014/0370989 A1* | 12/2014 | Acres | G07F 17/3234 |
| | | | 463/42 |
| 2015/0014925 A1* | 1/2015 | Miller | A63F 1/14 |
| | | | 273/148 R |
| 2015/0375096 A1* | 12/2015 | Jackson | G07F 17/322 |
| | | | 463/11 |
| 2016/0071367 A1 | 3/2016 | Litman | |
| 2016/0093135 A1* | 3/2016 | Bond | G07F 17/3241 |
| | | | 463/42 |
| 2016/0328913 A1 | 11/2016 | Blazevic | |
| 2017/0330136 A1* | 11/2017 | Bratter | G06Q 10/087 |
| 2018/0005486 A1* | 1/2018 | Risnoveanu | G06Q 20/207 |
| 2018/0068517 A1* | 3/2018 | Drennan, III | A63F 1/067 |
| 2018/0121874 A1* | 5/2018 | Chen | G06Q 30/0202 |
| 2018/0189921 A1 | 7/2018 | Feng | |
| 2018/0190064 A1 | 7/2018 | Feng | |
| 2019/0005768 A1 | 1/2019 | Wilkinson | |
| 2019/0164381 A1 | 5/2019 | Feng | |

OTHER PUBLICATIONS

Notice of Allowance for U.S. Appl. No. 29/615,741, dated May 22, 2018.
Office Action for U.S. Appl. No 15/396,342, dated Apr. 12, 2019.
Restriction Requirement for U.S. Appl. No. 15/688,841, dated Mar. 4, 2019.
Office Action for U.S. Appl. No. 15/826,680, dated May 16, 2019.
Karami et al., "Image Matching Using SIFT, SURF, BRIEF and ORB: Performance Comparison for Distorted Images", In Proceedings of the 2015 Newfoundland Electrical and Computer Engineering Conference,St. johns, Canada, Nov. 2015.
Office Action for U.S. Appl. No. 15/688,841, dated Jul. 15, 2019.
Final Office Action for U.S. Appl. No. 15/396,342, dated Oct. 10, 2019.
Office Action for U.S. Appl. No. 15/826,680, dated Nov. 25, 2019.
Office Action for U.S. Appl. No. 16/200,636, dated Dec. 17, 2019.
Notice of Allowance for U.S. Appl. No. 15/688,841, dated Mar. 2, 2020.
Advisory Action for U.S. Appl. No. 15/826,680, dated Mar. 9, 2020.
Final Office Action for U.S. Appl. No. 16/200,636, dated Apr. 2, 2020.

* cited by examiner

Gaming Apparatus 1, 10-1-2016, 15:00, — 300
    5 decks,
    $12,305,
    100=50,
    50=123 ← 302
    25=492
    10=1294

Gaming Apparatus 2, 10-1-2016, 15:10,
    7 decks,
    $18,543,
    100=50,
    50=153 ← 304
    25=692
    10=927

Gaming Apparatus 3, 10-1-2016, 15:20,
    7 decks,
    $11,123,
    100=50,
    50=153 ← 306
    25=421
    10=227

Gaming Apparatus 4, 10-1-2016, 15:30,
    2 decks,
    $23,112,
    100=43,
    50=232 ← 308
    25=642
    10=1346

*FIG. 3*

At Time 15:09:
Gaming Apparatus 4
10-1-2016
15:07
Card Request-5
Status: Pending

— 400

— 402

At Time 15:10:
Gaming Apparatus 4
10-1-2016
15:07
Card Request-5
Status: Pending
15:08 Supply Depository Notified
15:08 Attendant Assigned, John Doe

— 404

At Time 15:15:
Gaming Apparatus 4
10-1-2016
15:07
Card Request-5
Status: Pending
15:08 Supply Depository Notified
15:08 Attendant Assigned, John Doe
15:13: Attendant Pickup 5 Card Decks
Estimated Delivery Time: 15:18

— 406

At Time 15:20:
Gaming Apparatus 4
10-1-2016
15:07
Card Request-5
Status: Completed
15:08 Supply Depository Notified
15:08 Attendant Assigned, John Doe
15:13: Attendant Pickup 5 Card Decks
15:18: Delivery Completed

LOGISTIC MANAGEMENT OF GAMING SUPPLIES FOR GAMING ESTABLISHMENTS

BACKGROUND OF THE INVENTION

Today, gaming establishments, such as casinos, operate gaming apparatus, such as gaming tables that provide casino table games. Casino table games, such as Poker, Roulette, Black Jack, Craps, Baccarat, etc., often involve players sitting at a physical table using physical game objects (cards, dice, chips, etc.) to play the games.

To support such gaming tables, gaming establishments need to provide various support personnel as well as gaming supplies to gaming tables. For example, a gaming establishment might employ a full supporting staff of dealers, pit bosses, shift managers, cashier clerks, chip runners, waiters, service technicians, etc. to support its gaming tables. Gaming supplies often need replenished at gaming tables and various support personnel are enlisted to carry out replenishment. For example, a player might sit down at a gaming table offering the Black Jack game and seek to exchange $500 for one-hundred $5 chips. If the dealer realizes that its supply of $5 chips on hand at the gaming table is insufficient, then the dealer or pit boss would call on a chip-runner to take $500 of cash from the dealer's gaming table and go to a cashier's cage to exchange the $500 for one-hundred of $5 chips. As other examples, a gaming table might be in need of additional decks of cards or cash. The ability of the dealer or pit bosses to track and order additional gaming supplies is limited and thus can cause breaks or delays in game play at the associated gaming tables. It is also difficult for gaming establishments to efficiently manage and track its gaming supplies. Further, the use of personnel to support replenishment of gaming supplies is also inefficient.

Accordingly, there is a need for improved approaches to monitor, deliver and track casino supplies within a gaming establishment.

SUMMARY

Embodiments disclosed herein concern logistic management of gaming supplies for gaming establishments, such as casinos. The logistic management is electronically managed for automated or user-initiated logistic requests for gaming supplies as well as end-to-end monitoring of fulfillment of such requests. The end-to-end monitoring can make use of electronic monitors, electronic notifications and electronic tracking. Consequently, logistic management can efficiently and reliably monitor, deliver and track supplies within a gaming establishment. Additionally or alternatively to managing request for gaming supplies, logistic management can also manage requests, needs or desires for other supplies or services, such as food and beverage services, gaming services, inventory services, entertainment services, customer services, maintenance services, and the like.

According to one embodiment, logistic management can be largely automated and make use of electronic displays, computing resources and databases. In one implementation, the logistic management can be fully electronically managed. For example, fulfillment can use virtual vouchers (i.e., digital vouchers). In another embodiment, the logistic management can be partially electronically managed. For example, fulfillment can use physical vouchers. In still another embodiment, the logistic management does not use or require any vouchers, either physical or virtual.

The invention can be implemented in numerous ways, including as a method, system, device, apparatus (including computer readable medium and graphical user interface). Several embodiments of the invention are discussed below.

As a logistics system for management and fulfillment of gaming logistic requests, wherein the logistics system supports a plurality of gaming apparatus, each of the gaming apparatus can be configured to perform or facilitate a wager based game, and each of the gaming apparatus can include or be proximate to a gaming support appliance having an electronic monitor integral or proximate thereto. The logistics system can also include a logistic management server configured to communicate with the electronic monitor of the gaming support appliance of each of the gaming apparatus. The logistic management server being further configured to: receive data from the electronic monitor; determine whether the gaming support appliance associated with the electronic monitor needs a re-supply of physical assets; electronically transmit a re-supply request to supply depository when it is determined that the gaming support appliance associated with the electronic monitor needs a re-supply of physical assets; electronically transmit a delivery request for an attendant when it is determined that the gaming support appliance associated with the electronic monitor needs a re-supply of physical assets; and electronically record receipt of the re-supply of physical assets once the physical assets being requested by the re-supply request have be received at (i) the gaming support appliance associated with the electronic monitor that needed the re-supply of physical assets, or (ii) the gaming apparatus for the gaming support appliance associated with the electronic monitor that needed the re-supply of physical assets.

As a method for management and fulfillment of gaming logistic requests, one embodiment can include at least: electronically receiving data from an electronic monitoring system of a gaming support appliance of a gaming apparatus; determining whether the gaming support appliance associated with the electronic monitoring system needs a re-supply of physical assets based on the received data; electronically directing a re-supply request to a supply depository when it is determined that the gaming support appliance associated with the electronic monitoring system needs a re-supply of physical assets; and electronically directing a delivery request to a wireless communication device associated with an attendant when it is determined that the gaming appliance associated with the electronic monitoring system needs a re-supply of physical assets, the delivery request instructing the attendant to deliver the re-supply of physical assets to the gaming apparatus.

As a computer readable medium, including at least computer program code executable by one or more computing devices, for management and fulfillment of logistic requests, one embodiment can include at least: computer program code for electronically receiving data from an electronic monitor of a gaming support appliance of a gaming apparatus; computer program code for determining whether the gaming support appliance associated with the electronic monitor needs a supply of physical assets based on the received data; computer program code for electronically directing a supply request to a supply depository when it is determined that the gaming support appliance associated with the electronic monitoring system needs a supply of physical assets; and computer program code for electronically directing a delivery request to a wireless communication device associated with an attendant when it is determined that the gaming appliance associated with the electronic monitor that needs a supply of physical assets, the delivery request instructing the attendant to deliver the supply of physical assets to the gaming apparatus.

As a computer readable medium, including at least computer program code executable by one or more computing devices, for management and fulfillment of logistic requests, another embodiment can include at least: computer program code for electronically receiving data from a gaming support appliance of a gaming apparatus; computer program code for determining whether the gaming support appliance requests a deliverable item based on the received data; computer program code for electronically directing a supply request to a service center when it is determined that the gaming support appliance requests the deliverable item; and computer program code for electronically directing a delivery request to a wireless communication device associated with an attendant when it is determined that the gaming support appliance requests the deliverable item, the delivery request instructing the attendant to deliver the deliverable item.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 3 is an illustration of exemplary supply status data pertaining to a plurality of gaming apparatus, according to one embodiment.

FIG. 4 is an illustration of exemplary re-supply status data pertaining to processing of a re-supply request, according to one embodiment.

DETAILED DESCRIPTION OF CERTAIN EMBODIMENTS

Embodiments disclosed herein concern logistic management of gaming supplies for gaming establishments, such as casinos. The logistic management is electronically managed for automated or user-initiated logistic requests for gaming supplies as well as end-to-end monitoring of fulfillment of such requests. The end-to-end monitoring can make use of electronic monitors, electronic notifications and electronic tracking. Consequently, logistic management can efficiently and reliably monitor, deliver and track supplies within a gaming establishment. Additionally or alternatively to managing request for gaming supplies, logistic management can also manage requests, needs or desires for other supplies or services, such as food and beverage services, gaming services, inventory services, entertainment services, customer services, maintenance services, and the like.

According to one embodiment, logistic management can be largely automated and make use of electronic displays, computing resources and databases. In one implementation, the logistic management can be fully electronically managed. For example, fulfillment can use virtual vouchers (i.e., digital vouchers). In another embodiment, the logistic management can be partially electronically managed. For example, fulfillment can use physical vouchers. In still another embodiment, the logistic management does not use or require any vouchers, either physical or virtual.

Embodiments of various aspects of the invention are discussed below with reference to FIGS. 1-14. However, those skilled in the art will readily appreciate that the detailed description given herein with respect to these figures is for explanatory purposes as the invention extends beyond these limited embodiments.

Figure 1:
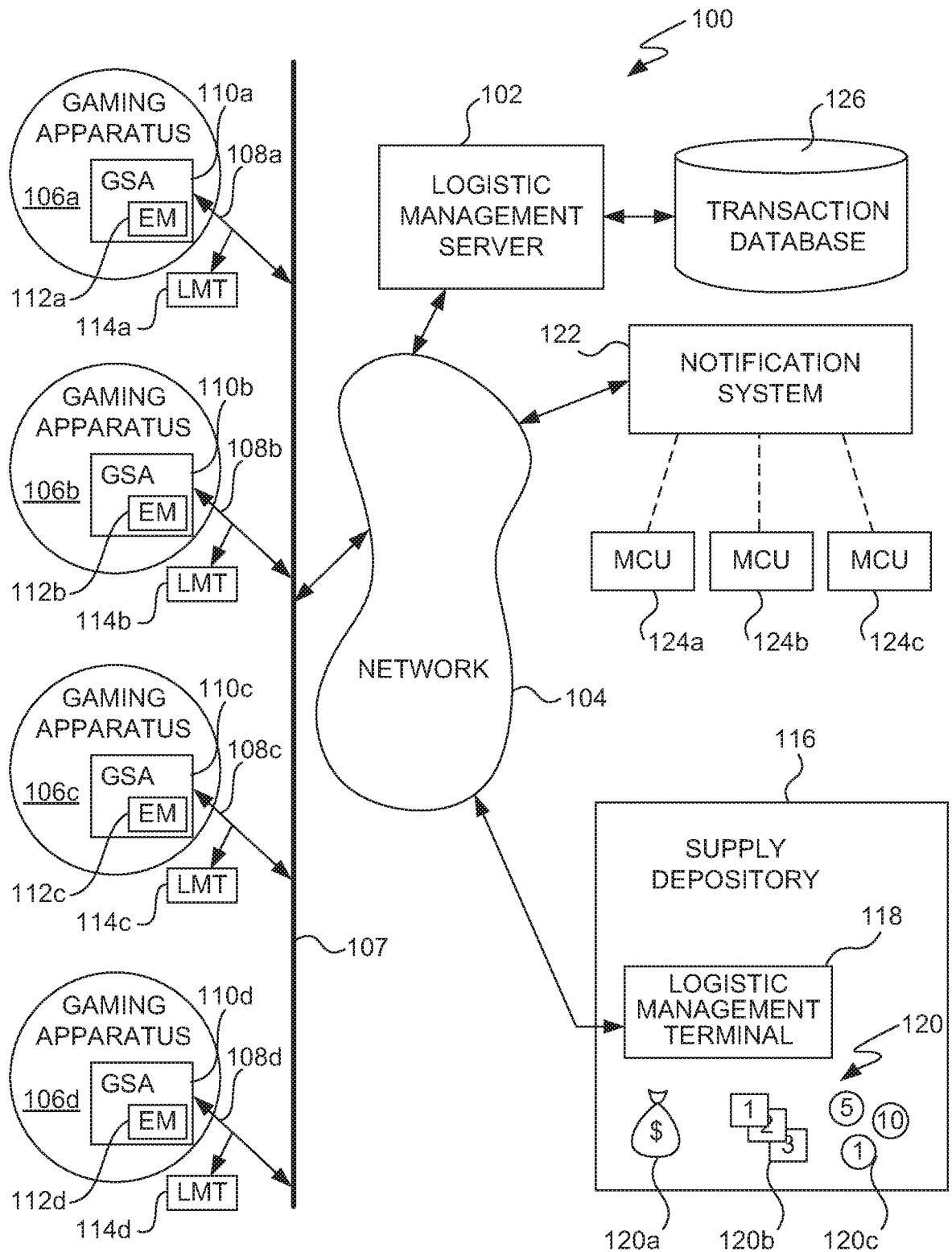
FIG. 1 is a block diagram of a gaming fulfillment system according to one embodiment.

FIG. 1 is a block diagram of a gaming fulfillment system 100 according to one embodiment. The gaming fulfillment system 100 serves to initiate, monitor and complete fulfillment of supplies within a gaming environment.

The gaming fulfillment system 100 includes a logistic management server 102 that provides backend processing for the gaming fulfillment system 100. The logistic management server 102 is coupled to at least one network 104. The network 104 can be a global network, a local area network, and/or any combination of wired and/or wireless networks. The gaming fulfillment system 100 supports a plurality of gaming apparatus 106 (i.e., 106a-106d). In the embodiment illustrated in FIG. 1, the gaming fulfillment system 100 supports gaming apparatus 106a, gaming apparatus 106b, gaming apparatus 106c, and gaming apparatus 106d. The gaming apparatus 106a-106d can pertain to a game of chance, such as a wager-based game or a skill-based game, or some combination thereof. Examples of gaming apparatus include gaming tables and slot machines. The gaming apparatus 106a can couple to the network 104 by way of a main network link 107 and an apparatus network link 108a. Similarly, the gaming apparatus 106b can couple to the network 104 by way of the main network link 107 and an apparatus network link 108b; the gaming apparatus 106c can couple to the network 104 by way of the main network link 107 and an apparatus network link 108c; and the gaming apparatus 106d can couple to the network 104 by way of the main network link 107 and an apparatus network link 108d.

The gaming apparatus 106 can also include or make use of a gaming support appliance 110 (i.e., 110a-110d). The gaming support appliance 110a is an electronic device that is coupled or proximate to the gaming apparatus 106a. The gaming support appliance 110a includes at least one electronic monitor 112a. The electronic monitor 112a can provide electronic monitoring of an aspect of the gaming apparatus 106a. For example, the gaming support appliance 110a having the at least one electronic monitor 112a can pertain to a card shoe, a chip rack, or a money drawer, which can be monitored by the at least one monitor 112a thereof. In such examples, the gaming supplies associated with the gaming apparatus 106a being made available and monitored by the gaming support appliance 110a would, for example, be the cards, chips and money, respectively.

In addition, a logistic management terminal 114a is electronically coupled to the gaming support appliance 110a, such as via the apparatus network link 108a. The logistic management terminal 114a can provide a display that can present information to a person associated with the gaming apparatus 106a. For example, the gaming apparatus 106a can support a dealer associated with a wagering game being carried out at the gaming apparatus 106a. The logistic management terminal 114a can present information to the person (e.g., dealer) associated with the gaming apparatus 106a and/or can permit the person to request or receive gaming supplies for use at the gaming apparatus 106a.

Furthermore, the gaming fulfillment system 100 can include a supply depository 116. The supply depository 116 stores or manages inventory for gaming supplies. The supply depository 116 can include a logistic management terminal 118. The logistic management terminal 118 can be operatively connected to the network 104. The logistic management terminal 118 can be used by supply personnel at the supply depository 116. The logistic management terminal 118 can, for example, include or couple to a display device to present information for use by the supply personnel. For example, the logistic management terminal 118 can present information associated with an incoming re-supply request from a particular gaming apparatus. The information displayed can thus informed the supply personnel that the particular gaming apparatus, or its dealer, is in need of re-supply of particular gaming supplies 120. The supply depository 116 can include various gaming supplies under its care. As examples, the gaming supplies can include cash 120a, cards 120b and/or chips 120c.

Further still, the gaming fulfillment system 100 can include a notification system 122. The notification system 122 can be utilized to provide notifications to any persons interacting with the gaming fulfillment system 100. The notification system 122 can provide notifications to various persons. For example, the notifications can be provide to dealers associated with gaming apparatus 106, supply personnel associated with supply depositories 116, and/or notifications to attendants (e.g., delivery attendants). For notifications to dealers, the notification system 122 can send notifications to the logistic management terminal 114 (i.e., 114a-114d) associated with the gaming apparatus 106 where the dealer is operating. For notifications to supply personnel, the notification system 122 can send notifications to the logistic management terminal 118 associated with the supply depository 116 where the supply personnel is assigned. With respect to notifications to attendants, the attendants are typically associated with mobile communication units 124 (i.e., 124a-124d), whereby the notification system 122 can send notifications to particular attendants. As illustrated in FIG. 1, the notification system 122 can provide notifications to any one or more of the mobile communications units 124a, 124b and 124c. As an example, the mobile communication units 124a, 124b and 124c are normally associated with different attendants. In an alternate embodiment, the other persons can use mobile communication units, even dealers or supply attendants.

The gaming fulfillment system 100 can also include a transaction database 126 that can be coupled to the logistic management server 102. The transaction database 126 can provide storage for transaction data (e.g., records) associated with fulfillment of re-supplies to various gaming apparatus. The transaction data can provide a transaction log. The transaction data can be stored to the transaction database 126 and can be utilized for ensuring that all transactions are carefully monitored and recorded for future review, audit, and the like.

The gaming fulfillment system 100 can store supply status data that is descriptive of the quantities of gaming supplies 120 resident within the supply depository 116. As discussed above, the gaming supplies can include cash 120a, cards 120b and chips 120c. The quantities of the gaming supplies at the supply depository 116 can be monitored or recorded in any of a variety of different ways, including manual counting and data entry into the logistic management terminal 118, or through use of electronic sensors using an electronic appliance, or some combination thereof.

In addition, the gaming fulfillment system 100 can also provide active supply status data pertaining to the plurality of gaming apparatus 106 (i.e., 106a-106d). In this regard, the gaming apparatus 106 can make use of the gaming support appliance 110 (i.e., 110a-110d) having the at least one electronic monitor 112 (i.e., 112a-112d) to acquire the data pertaining to the status of supplies at the associated gaming apparatus 106. Such supply status data pertaining to the gaming apparatus 106 can be transmitted to the logistic management server 102 for storage in the transaction database 126 or some other storage device. The supply status data can be provided to the logistic management server 102 by the gaming apparatus 106 (or its gaming support appliance 110) in real-time or near real-time. For example, the supply status data could be provided whenever a change has been identified, on a periodic basis, or when manually or automatically triggered, or some combination thereof.

Figure 2:
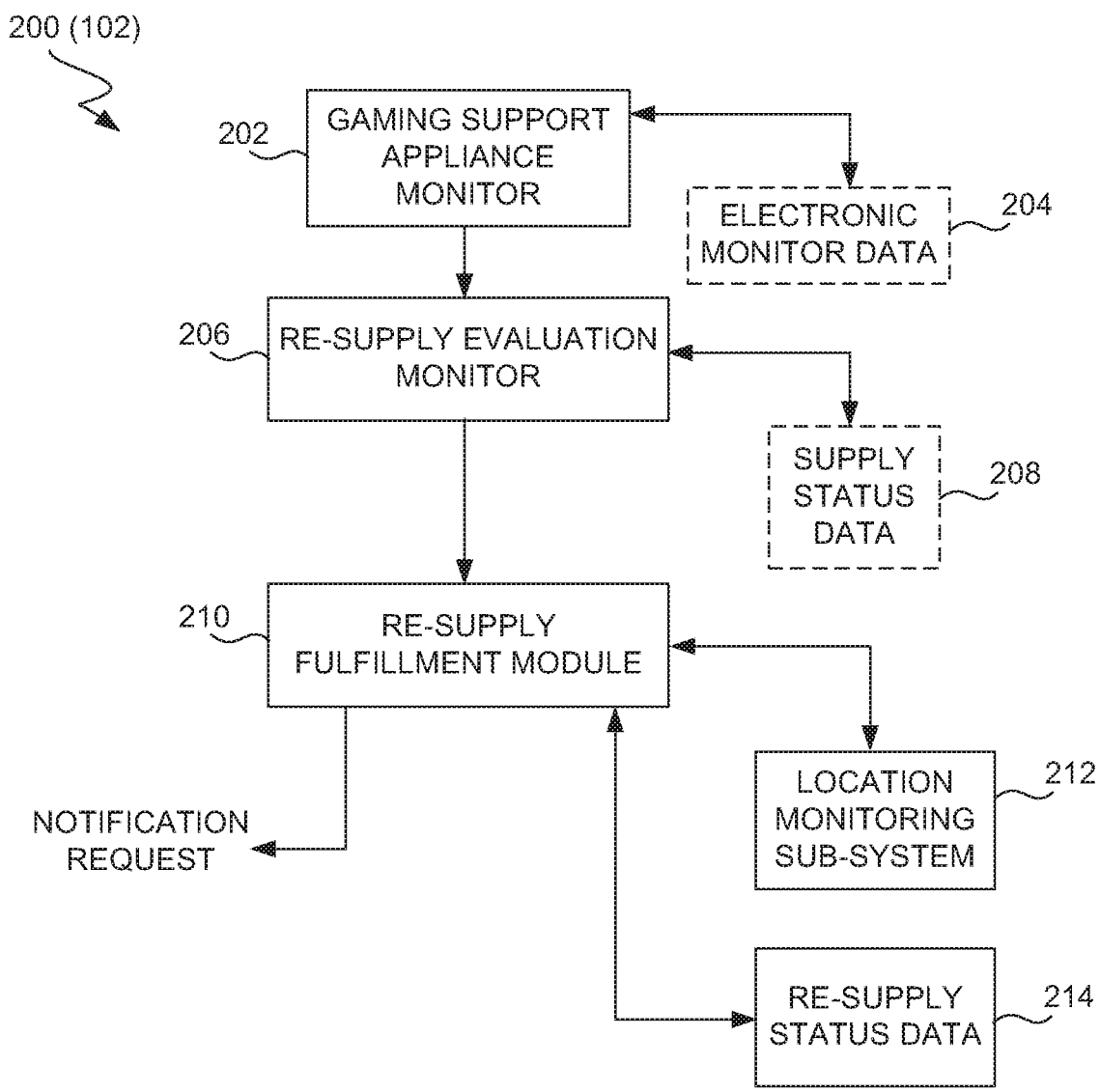
FIG. 2 is a block diagram of a logistic management server according to one embodiment.

FIG. 2 is a block diagram of a logistic management server 200 according to one embodiment. The logistic management server 200 is, for example, suitable for use as one implementation of the logistic management server 102 illustrated in FIG. 1.

The logistic management server 200 includes a gaming support appliance monitor 202. The gaming support appliance monitor 202 couples to one or more electronic monitors 112 via the network 104. The gaming support appliance monitor 202 receives electronic monitor data 204 provided by the one or more electronic monitors 112 associated with gaming support appliances. The gaming support appliance monitor 202 can then determine based on the electronic monitor data 204 whether re-supply of gaming supplies (e.g., gaming assets) is required.

The logistic management server 200 also includes a re-supply evaluation monitor 206. The re-supply evaluation monitor 206 can receive monitoring data from the gaming support appliance monitor 202. The re-supply evaluation monitor 206 can also receive supply status data 208. The supply status data 208 is status data that is descriptive of the status of gaming supplies, such as gaming assets. For example, the gaming assets can include cash, cards or chips that are available at one or more supply depositories, such as the supply depository 116. The re-supply evaluation monitor 206 can determine whether or not a re-supply should be requested. When the re-supply evaluation monitor 206 determines that a re-supply should be requested, the re-supply evaluation monitor 206 so informs a re-supply fulfillment module 210.

The re-supply fulfillment module 210 operates to initiate and manage completion of the re-supply being requested. In this regard, the re-supply fulfillment module 210 can couple to a location monitoring subsystem 212 to obtain location information. The location information can pertain to the location of supplies, the location of attendants, the location of gaming apparatus, etc. The re-supply fulfillment module 210 can also maintain re-supply status data 214. For example, the re-supply status data 214 can be stored to an electronic storage device in a file or a database. The re-supply status data 214 can also include or be referred to as log data or transaction data. Additionally, the re-supply fulfillment module 210 can also initiate one or more notification requests associated with the re-supply request and/or its fulfillment. The notification requests are used to initiate notifications to one or more devices (e.g., logistic management terminals 114, 118 or mobile communication devices 124).

FIG. 3 is an illustration of exemplary supply status data 300 pertaining to a plurality of gaming apparatus, according to one embodiment. The supply status data 300, in this example, details the quantity of particular supplies resident at a particular gaming apparatus. More particularly, as shown in FIG. 3, the supply status data 300 details the status of supplies that gaming apparatus 1, gaming apparatus 2, gaming apparatus 3 and gaming apparatus 4.

The gaming apparatus 1 has supply status data 302 that includes a timestamp (including date and time) for the data, and quantities of (i) decks of cards, (ii) cash on hand, and (iii) quantities of various chips. In the particular example of the supply status data 302 illustrated in FIG. 3, the supply status data 302 indicates that on Oct. 1, 2016 at the time of 15:00 there were five decks of cards, $12,305 of cash on hand, and fifty $100 chips, one hundred twenty-three $50 chips, four hundred ninety-two $25 chips, and one thousand two hundred ninety-four $10 chips on hand.

The gaming apparatus 2 has supply status data 304 that includes a timestamp (including date and time) for the data, and quantities of (i) decks of cards, (ii) cash on hand, and (iii) quantities of various chips. In the particular example of the supply status data 304 illustrated in FIG. 3, the supply status data 304 indicates that on Oct. 1, 2016 at the time of 15:10 there were seven decks of cards, $18,543 of cash on hand, and fifty $100 chips, one hundred fifty-three $50 chips, six hundred ninety-two $25 chips, and nine hundred twenty-seven $10 chips on hand.

The gaming apparatus 3 has supply status data 306 that includes a timestamp (including date and time) for the data, and quantities of (i) decks of cards, (ii) cash on hand, and (iii) quantities of various chips. In the particular example of the supply status data 306 illustrated in FIG. 3, the supply status data 306 indicates that on Oct. 1, 2016 at the time of 15:20 there were seven decks of cards, $11,123 of cash on hand, and fifty $100 chips, one hundred fifty-three $50 chips, four hundred twenty-one $25 chips, and two hundred twenty-seven $10 chips on hand.

The gaming apparatus 4 has supply status data 308 that includes a timestamp (including date and time) for the data, and quantities of (i) decks of cards, (ii) cash on hand, and (iii) quantities of various chips. In the particular example of the supply status data 308 illustrated in FIG. 3, the supply status data 308 indicates that on Oct. 1, 2016 at the time of 15:30 there were two decks of cards, $23,112 of cash on hand, and forty-three $100 chips, two hundred thirty-two $50 chips, six hundred forty-two $25 chips, and one thousand three hundred forty-six $10 chips on hand.

FIG. 4 is an illustration of exemplary re-supply status data 400 pertaining to processing of a re-supply request, according to one embodiment. The re-supply status data 400 is able to be captured and recorded as various sub-transactions associated with processing of a particular re-supply request. As a result, the re-supply status data 400 can provide a transaction record for the processing of the particular re-supply request. As illustrated in FIG. 4, the status of the processing of the re-supply request is depicted over a period of time to detail the processing of the various intermediate transactions.

In the example shown in FIG. 4, the re-supply status data 400 is depicted for gaming apparatus 4 and the processing of a re-supply request for cards. A first re-supply status data 402 pertains to time 15:09 on Oct. 1, 2016 and indicates that gaming apparatus 4 at 15:07 has a card request for five decks of cards that is currently pending.

A second re-supply status data 404 pertains to time 15:10 on Oct. 1, 2016 and indicates that the same card request from gaming apparatus 4 remains pending and indicates that two processing transactions have occurred. The first processing transaction indicates that at 15:08 the supply depository was notified of the re-supply request for the five decks of cards. The second processing transaction indicates that at 15:08 an attendant, John Doe, was assigned to participate in the re-supply delivery of the decks of cards to gaming apparatus 4.

A third re-supply status data 406 indicates that at the time 15:15 on Oct. 1, 2016, the same card request from gaming apparatus 4 still remains pending but additional processing transactions have been denoted. A third processing transaction indicates that at 15:13 the attendant (namely, John Doe) picked up five decks of cards from a supply depository. Further, the third re-supply status data 406 also indicates an estimated delivery time of 15:18, which is the anticipated delivery time for the attendant to deliver the five decks of cards to the gaming apparatus 4.

A fourth re-supply status data 408 indicates that at time 15:20 on Oct. 1, 2016, the card request from gaming apparatus for has been completed. The fourth re-supply status data 408 specifically indicates that at 15:18 the delivery of the five decks of cards was achieved and acknowledged at the gaming apparatus 4.

Figure 5:
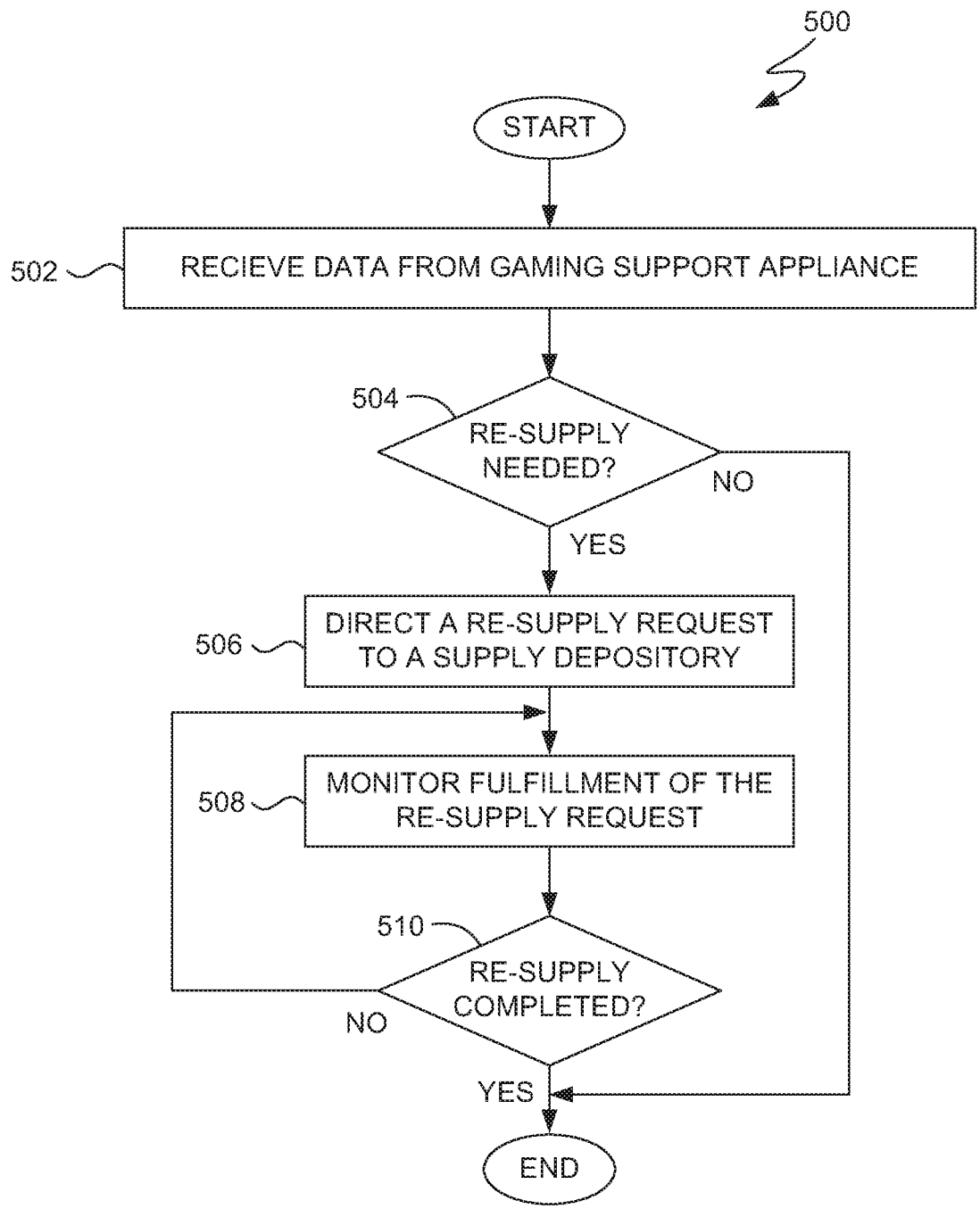
FIG. 5 is a flow diagram of a re-supply process according to one embodiment.

FIG. 5 is a flow diagram of a re-supply process 500 according to one embodiment. The re-supply process 500 is, for example, performed by a logistic management server, such as the logistic management server 102 illustrated in FIG. 1.

The re-supply process 500 receives 502 data from at least one gaming support appliance. For example, the gaming support appliance can be the gaming support appliance 110 Illustrated in FIG. 1. The data from a gaming support appliance being received 502 can be provided by the gaming support appliance 110 shown in FIG. 1 which is associated with a gaming device (e.g., gaming table, gaming machine, etc.). By analyzing such data, the re-supply process 500 is able to initiate and manage a re-supply of gaming supplies.

After the data from the at least one gaming support appliance has been received 502, a decision 504 can determine whether re-supply is needed. Here, for example, the re-supply process 500 can evaluate whether re-supply needed based on the data received 502 from the gaming support appliance. When the decision 504 determines that re-supplies not needed, then the re-supply process 500 can end because no re-supply is being requested.

On the other hand, when the decision 504 determines that re-supply is needed, a re-supply request can be directed 506 to a supply depository. The supply depository is, for example, the supply depository 116 shown in FIG. 1. The supply depository is a depository that holds supplies, such as gaming supplies, for use by the gaming system. In one embodiment, the gaming supplies include gaming assets such as cash, cards or chips. If multiple supply depositories are available, various techniques can be used to select a supply depository to service the re-supply request.

After the re-supply request is directed 506 to the supply depository, the re-supply process 500 can monitor 508 for fulfillment of the re-supply request. The monitoring 508 of the fulfillment can record completion of actions (e.g., transactions) associated with fulfillment of the re-supply request. In one embodiment, the monitoring 508 can be step-by-step monitoring. More generally, the fulfillment or monitoring of a re-supply effort can record actions such as receipt of a re-supply request, schedule of the re-supply being requested, arrange for availability of supplies requested, coordinate delivery of the supplies, acknowledge transfer and/or delivery of supplies.

A decision 510 can determine whether the re-supply as requested by the re-supply request has been completed. When the decision 510 determines that the re-supply has not been completed, the re-supply process 500 can return to repeat the block 508 and subsequent blocks. Once the decision 510 determines that the re-supply has been completed, the re-supply process 500 can end since the re-supply that was requested has been fulfilled.

Figure 6:
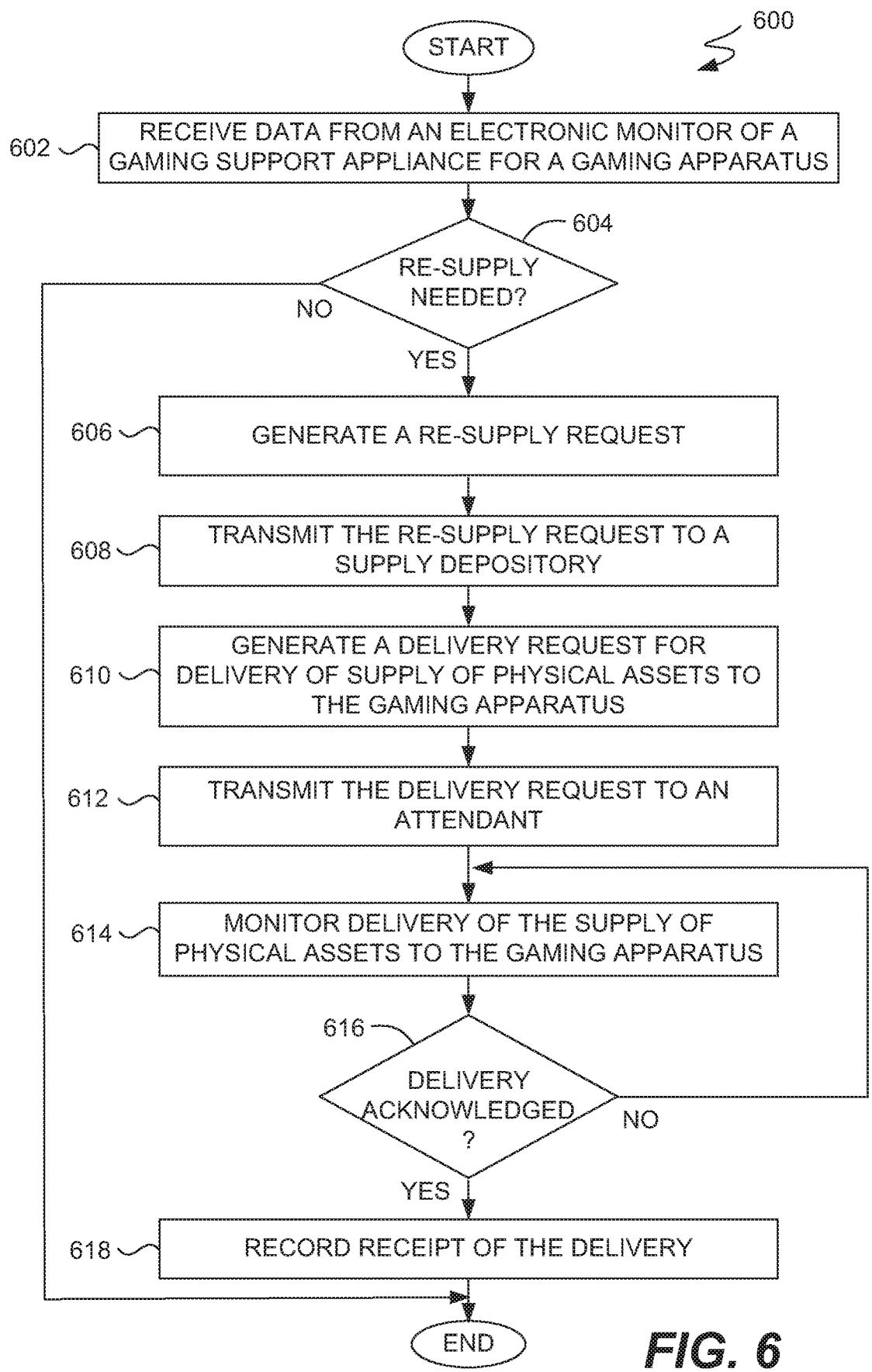
FIG. 6 illustrates a flow diagram of a re-supply process according to another embodiment.

FIG. 6 illustrates a flow diagram of a re-supply process 600 according to another embodiment. The re-supply process 600 is, for example, performed by a logistic management server, such as the logistic management server 102 illustrated in FIG. 1.

The re-supply process 600 receives 602 data from an electronic monitor of a gaming support appliance for a gaming apparatus. The electronic monitor provides data for the gaming support appliance. For example, with reference to FIG. 1, the gaming apparatus 106 includes gaming support appliance 110 that in turn includes at least one electronic monitor 112. After the data has been received 602 from the electronic monitor of the gaming support appliance, a decision 604 can determine if re-supply needed. When the decision 604 determines that re-supply is not needed, then the re-supply process 604 can end since re-supply is not needed.

On the other hand, when the decision 604 determines that re-supply is needed, the re-supply process 600 can continue. In this regard, a re-supply request can be generated 606. Next, the re-supply request can be transmitted 608 to a supply depository. After the re-supply request is transmitted 608, a delivery request for delivery of a supply of physical assets to the gaming apparatus can be generated 610. The delivery request can then be transmitted 612 to an attendant. The attendant is charged with the task of delivering the supply of physical assets (i.e., gaming assets) corresponding to the delivery request to the corresponding gaming apparatus.

The delivery of the supply of the physical assets to the gaming apparatus can also be monitored 614. A decision 616 can determine whether the delivery of the physical assets has been acknowledged. Here, the acknowledgment can be user initiated or apparatus initiated, whichever is able to acknowledge receipt of the physical assets that are being delivered. When the decision 616 determines that delivery has not yet been acknowledged, the re-supply process can return to repeat the block 614 so that the delivery of the supply of the physical assets to the gaming apparatus can continue to be monitored 614. Once the decision 616 determines that the delivery of the supply of the physical assets to the gaming apparatus has been acknowledged, the re-supply process 600 can record 618 receipt of the delivery. Following the block 618, the re-supply process 600 can end since the requested re-supply has been fulfilled.

In an alternative embodiment, the monitoring 614 can track the location of the physical assets and/or the attendant delivering the physical assets. Hence, the attendant delivery of the physical assets has deviated from an acceptable route or delayed, those monitoring the re-supply effort can be alerted. The monitoring can also cause an estimated delivery time for arrival of the physical supplies to be adjusted.

Figure 7:
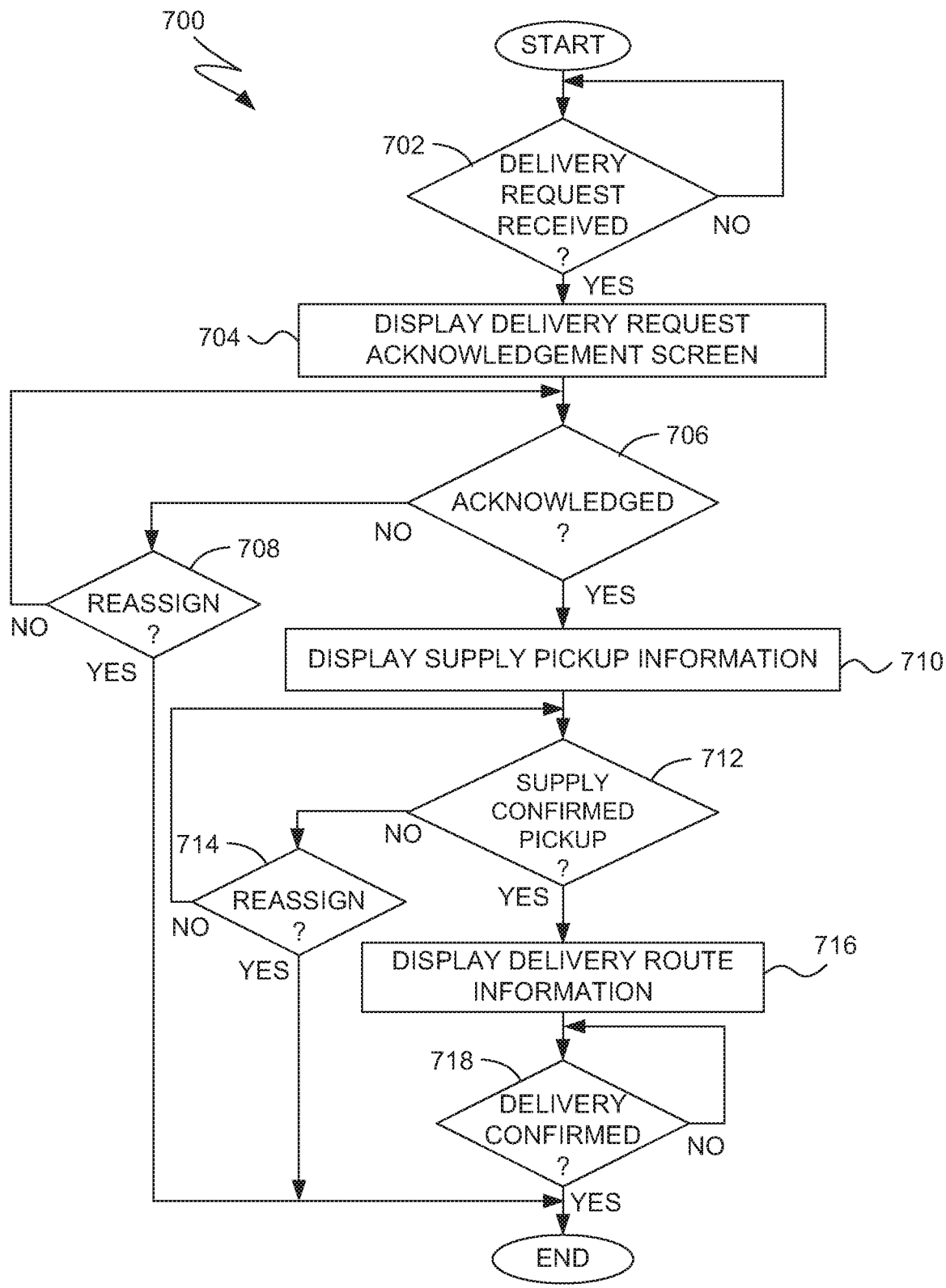
FIG. 7 is a flow diagram of a delivery process according to one embodiment.

FIG. 7 is a flow diagram of a delivery process 700 according to one embodiment. The delivery process 700 can be associated with a mobile communication unit, such as the mobile communication unit 124 illustrated in FIG. 1, which can also be considered a mobile computing device as it has capabilities of a computing device. As an example, the mobile communication unit can be used by an attendant (delivery attendant).

The delivery process 700 can include a decision 702 that determines whether a delivery request has been received. When the decision 702 determines that a delivery request has not yet been received, the delivery process 700 can await such a request.

On the other hand, when the decision 702 determines that a delivery request has been received, the delivery process 700 can continue. In this regard, a delivery request acknowledgment screen can be displayed 704. Typically, the delivery request acknowledgment screen would be displayed 704 on a display device associated with the mobile communication unit. The delivery request acknowledgment screen is, for example, a request to the attendant to acknowledge that they have accepted the particular requested delivery. A decision 706 can then determine whether the delivery request has been acknowledged. When the decision 706 determines that the delivery request has not been acknowledged, a decision 708 can determine whether the delivery request has been or will be reassigned to another attendant. When the decision 708 determines that the delivery request has been reassigned, the delivery process 700 with respect to the attendant can end. In this case, the delivery request has or will be reassigned to another attendant and thus the initial attendant is no longer directed to perform the delivery.

On the other hand, when the decision 708 determines that the delivery request has not been reassigned, the delivery process 700 can return to repeat the decision 706 to await an acknowledgment by the attendant. Once the decision 706 determines that the attendant has acknowledged the delivery request, supply pickup information can be displayed 710. Here, the supply pickup information is information that informs the attendant what and where supplies are to be picked up. Typically, the supply pickup information would inform the attendant to proceed to a supply depository were certain gaming supplies are to be acquired for delivery to a particular gaming apparatus.

Next, a decision 712 can determine whether the supply pickup has been confirmed. When the decision 712 determines that the supply pickup has not yet been confirmed, a decision 714 can determine whether the delivery process 700 has or will be reassigned. When the decision 714 determines that the delivery request has or will been reassigned, the delivery process 700 can end. Alternatively, when the decision 714 determines that the delivery request has not been reassigned, the delivery process 700 can return to repeat the decision 712 to await confirmation of the supply pickup. Once the decision 712 determines that the supply pickup has been confirmed, delivery route information can be displayed 716. The delivery route information can be displayed on the display device of the mobile communication unit associated with the attendant. As a result, the attendant can be informed of the requested delivery route by which the attendant should follow to deliver the acquired supplies to a particular gaming apparatus. For example, the delivery route information can be present or include a map (e.g., casino floor map), flashing beacon of current position and/or delivery destination, or directional pointer of current position and/or delivery destination, any of which can guide the attendant in delivering the acquired supplies to a particular gaming apparatus.

Next, a decision 718 can determine whether the delivery has been confirmed. Here, delivery can be confirmed after the acquired supplies have been delivered to the requested destination. When the decision 718 determines that the delivery has not yet been confirmed, the delivery process 700 can await such confirmation. Once the decision 718 determines that the delivery has been confirmed, the delivery process 700 has been completed and can end.

Figure 8A:
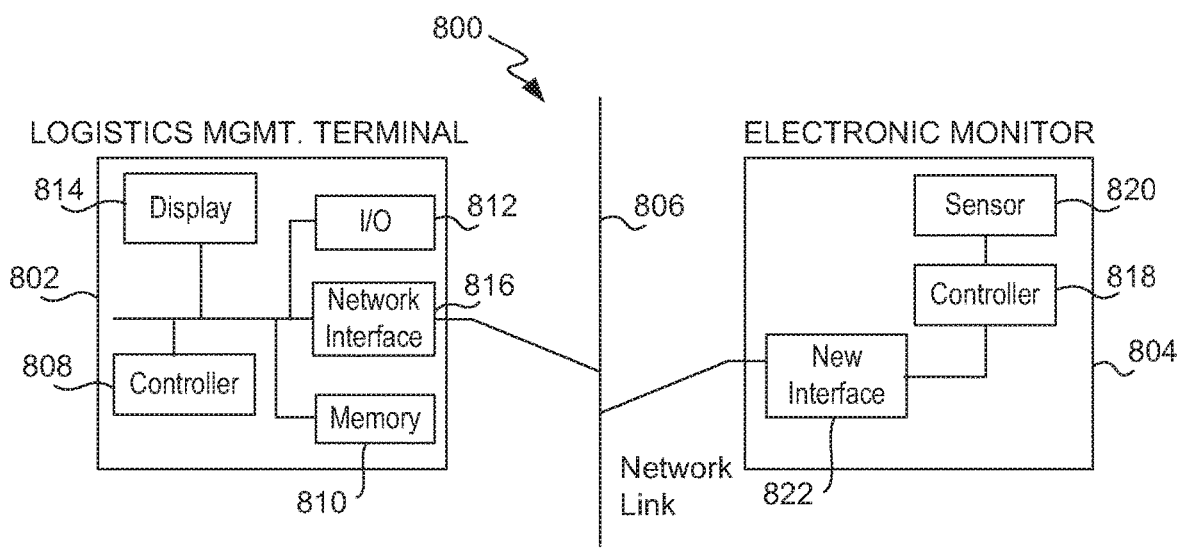
FIGS. 8A-8C illustrate different monitoring configurations according to different embodiments.
Figure 8B:
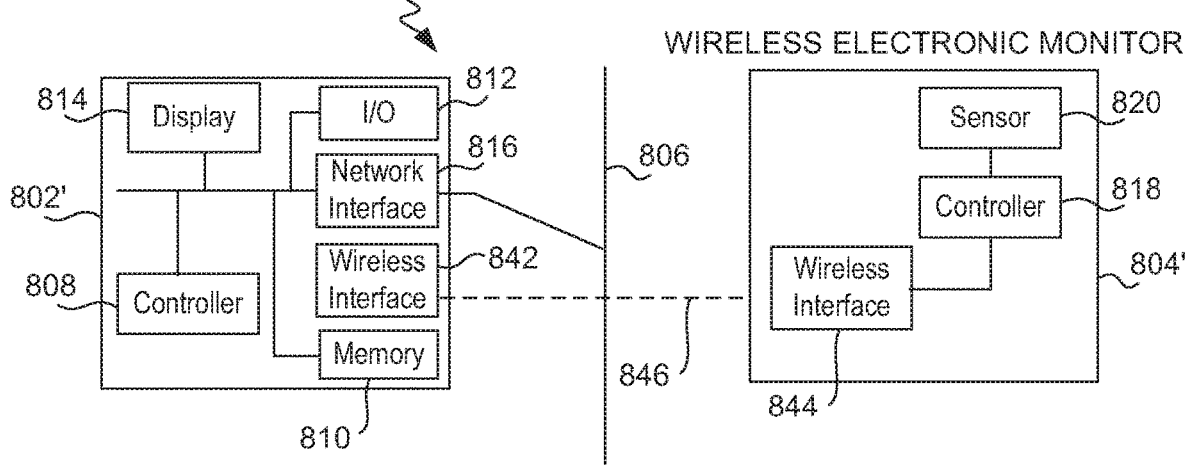
Figure 8C:
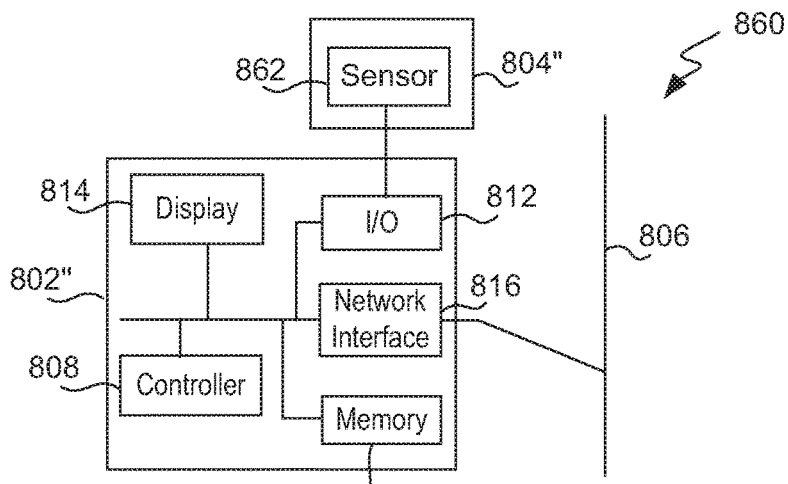

FIGS. 8A-8C illustrate different monitoring configurations according to different embodiments. The different monitoring configurations can be utilized with a gaming fulfillment system, such as the gaming fulfillment system 100 illustrated in FIG. 1.

FIG. 8A is a block diagram of a first monitoring configuration 800 according to one embodiment. The first monitoring configuration 800 includes a logistics management terminal 802 coupled to an electronic monitor 804 by way of one or more network links 806. The logistics management terminal 802 is, for example, suitable for use as the logistics management terminal 114 and/or the logistics management terminal 118 illustrated in FIG. 1. The logistics management terminal 802 can include a controller 808 that controls the overall operation of the logistics management terminal 802. In doing so, the controller 808 couples to memory 810, input/output interface 812 and a display 814. The controller 808 also couples to a network interface 816 that can coupled to the one or more network links 806. The electronic monitor 804 can include a controller 818 that controls the overall operation of the electronic monitor 804, which typically monitors gaming supplies. In doing so, the controller 818 couples to one or more sensors 820. The electronic monitor 804 is also coupled to the one or more network links 806 via a network interface 822. The electronic monitor 804 is typically part of or coupled to a gaming support appliance.

FIG. 8B is a block diagram of a second monitoring configuration 840 according to one embodiment. The second monitoring configuration 840 includes a logistics management terminal 802' coupled to an electronic monitor 804'. The second monitoring configuration 840 is generally similar to the first electronic configuration 800. That is, the logistics management terminal 802' is similar to the logistics management terminal 802, and the electronic monitor 804' is similar to the electronic monitor 804. However, the second monitoring configuration 840 also supports wireless data exchange between the logistics management terminal 802' and the wireless electronic monitor 804'. To support wireless communication, the logistics management terminal 802' includes a wireless interface 842, and the wireless electronic monitor 804' includes a wireless interface 844. The wireless interface 842 and the wireless interface 844 can interact over one or more wireless network links 846. The electronic monitor 804' is typically part of or coupled to a gaming support appliance.

FIG. 8C is a block diagram of a third monitoring configuration 860 according to one embodiment. The third monitoring configuration 860 includes a logistics management terminal 802" that is similarly configured as the logistics management terminal 802 illustrated in FIG. 8A. However, in the third monitoring configuration 860, an electronic monitor 804" is integrated with or directly coupled to the logistics management terminal 802". Specifically, at least one sensor 862 is coupled to the input/output interface 812 of the logistics management terminal 802". In this embodiment, the electronic monitor 804" need only include the sensor 802 as any processing, etc. can be done using the components of the logistics management terminal 802".

Additionally, an electronic monitor can be embedded or integral with or coupled to a gaming support appliance. Examples of gaming support appliances are an electronic card shoe, an electronic chip rack and an electronic cash box. Through electronic monitoring, the gaming fulfillment system is able to know and/or track gaming supplies.

Generally speaking, the electronic monitors illustrated in FIGS. 8A-8C can be coupled to the network link 806, which enables data from an electronic monitor to be provided to any component within a gaming fulfillment system. For example, the monitored data from an electronic monitor can be provided to the logistics management server 102 for monitoring whether a re-supply is needed at any particular gaming apparatus associated with the electronic monitor. Likewise, with respect to the supply depository 116, an electronic monitor can be utilized to monitor and/or track the availability of supplies within the supply depository 116.

Although an electronic monitor can interact with electronic components within or supported by a gaming support appliance or a logistics management terminal, an electronic monitor can also directly communicate with any electronic component within a gaming fulfillment system, such as the logistics management server 102. Additionally, it should be understood that electronic monitors can operate apart from a logistic management terminal or a gaming support appliance.

Figure 9A:
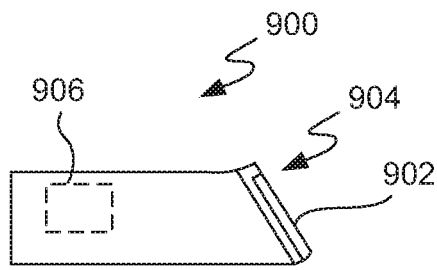
FIG. 9A illustrates an electronic card shoe according to one embodiment.

FIG. 9A illustrates an electronic card shoe 900 according to one embodiment. The electronic card shoe 900 is one example of a gaming support appliance. The electronic card shoe 900 can monitor card counts, card images, card dealing, etc. The electronic card shoe 900 operates to hold a plurality of cards 902 that can be serially output from an output end 904. The electronic card shoe 900 also includes an electronic monitor 906. As shown in FIG. 9A, the electronic monitor 906 can be embedded in the electronic card shoe 900.

Figure 9B:
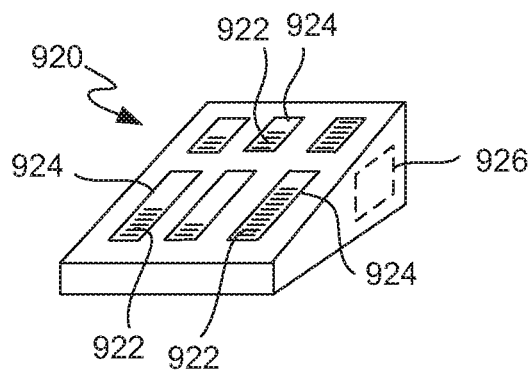
FIG. 9B illustrates an electronic chip rack according to one embodiment.

FIG. 9B illustrates an electronic chip rack 920 according to one embodiment. The electronic chip rack 920 is another example of a gaming support appliance. The electronic chip rack 920 can monitor counts of various chip denominations. The electronic chip rack 920 operates to hold various gaming chips 922 of different denominations. The electronic chip rack 920 includes recesses 924 configured to hold the gaming chips 922. The electronic chip rack 920 also includes an electronic monitor 926. The electronic chip rack 920 can track a number of chips of various denominations provided in the electronic chip rack 920. As shown in FIG. 9B, the electronic monitor 926 can be embedded in the electronic chip rack 920.

Figure 9C:
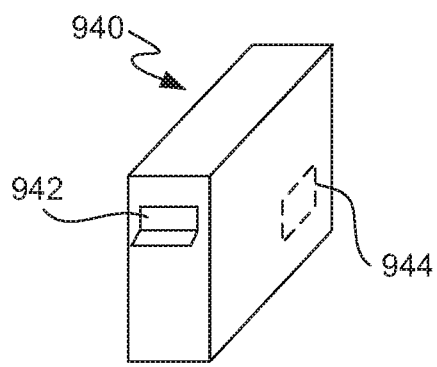
FIG. 9C illustrates an electronic cash box according to one embodiment.

FIG. 9C illustrates an electronic cash box 940 according to one embodiment. The electronic cash box 940 is still another example of a gaming support appliance. The electronic cash box 940 can track quantities of currency that has been deposited into the electronic cash box 940. The electronic cash box 940 operates to store cash that has been inserted into the electronic cash box 940 via a deposit slot 942. The electronic cash box 940 also includes an electronic monitor 944. As shown in FIG. 9C, the electronic monitor 944 can be embedded in the electronic cash box 940.

An electronic gaming system, gaming management system or fulfillment system can be implemented or embodied in various ways. Examples of several embodiments are illustrated below in FIGS. 10-13. Features of various different embodiments discussed herein can be combined as desired.

Figure 10:
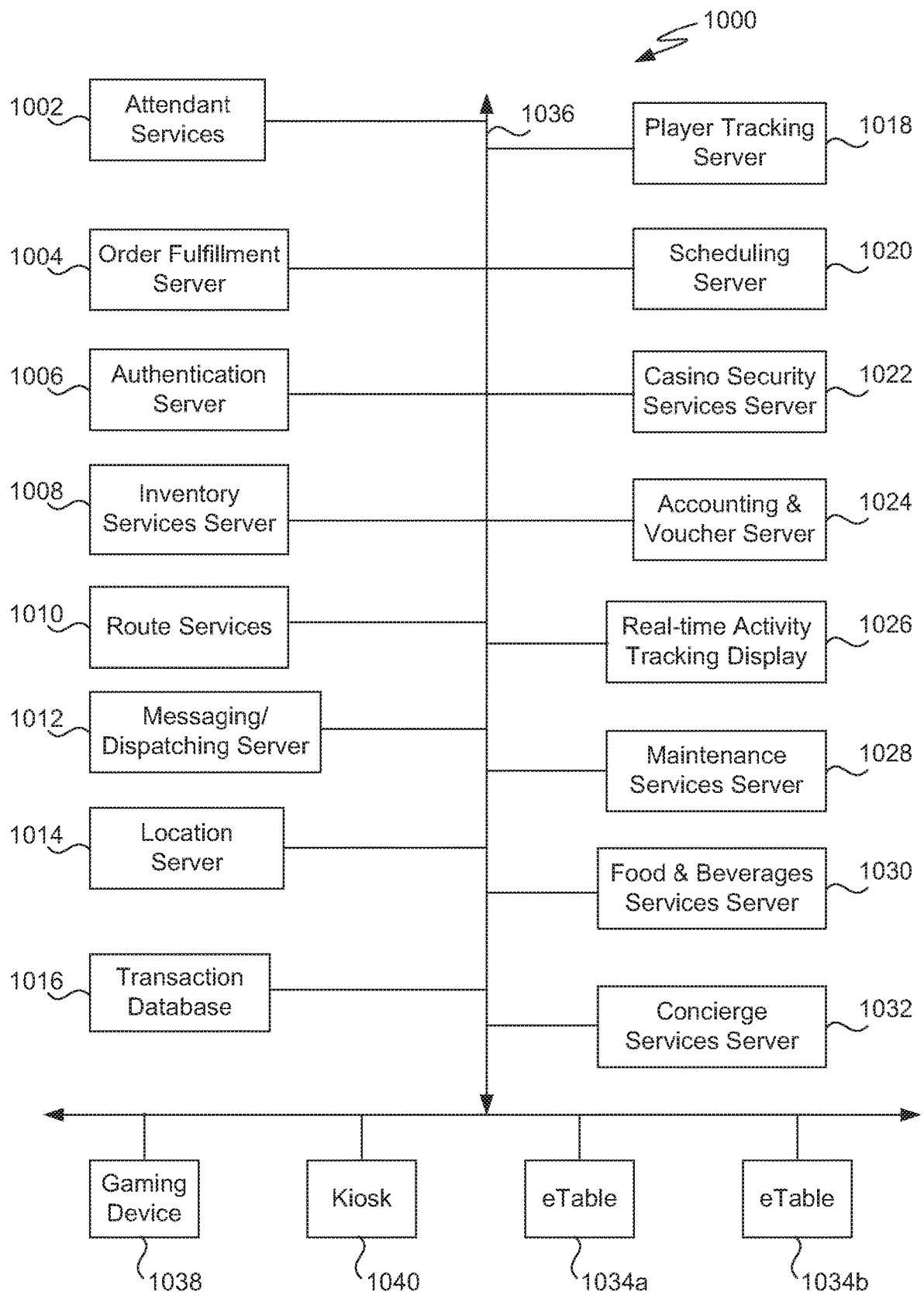
FIG. 10 illustrates a block diagram of an exemplary gaming management system according to one embodiment.

FIG. 10 illustrates a block diagram of an exemplary gaming management system 1000 according to one embodiment. The gaming management system 1000 serves to initiate, monitor, manage, and complete fulfillment of supplies, services, and requests within a gaming environment. The gaming management system 1000 includes a fulfillment network 1036. The fulfillment network 1036 may be in communication with various servers and resources discussed below. Additionally, fulfillment network 1036 may be a global network, a local area network, and/or any combination of wired and/or wireless networks.

The gaming management system 1000 may include an order fulfillment server 1004 in communication with fulfillment network 1036. The order fulfillment server 1004 may be similar to logistic management server 102 discussed with reference to FIG. 1. Order fulfillment server 1004 may provide the backend processing for the gaming management system 1000. Order fulfillment server 1004 may support a plurality of gaming apparatuses such as gaming device 1038, kiosk 1040, eTables 1034a-1034b, and the like. The gaming apparatuses 1038, 1040, 1034a and 1034b can pertain to a game of chance, such as a wager-based game or a skill-based game, or some combination thereof. Examples of gaming apparatus include gaming tables, slot machines, portable gaming devices, and the like.

Order fulfillment server 1004 may receive, transmit, and manage any services and/or requests required within the gaming environment. For example, services and requests may be to fulfill a drink order, clean up a spill at a location within the gaming environment, manage a win at a slot machine, change cards at a card table, replace dice at a crap table, and any other services within the gaming environment. Those of ordinary skill in the art will know understand and know that services and/or requests may vary from food and beverage services, gaming services, inventory services, entertainment services, customer services, maintenance services, and the like.

When services are required, a request may be transmitted to order fulfillment server 1004 by a casino employee and/or a customer. For example, a black jack table may need additional chips. The request for additional chips at a table game may be transmitted to order fulfillment server 1004 via a gaming support appliance 110, as discussed with reference to FIG. 1. The request may be automatically transmitted by the gaming support appliance or requested by the dealer or pit boss.

In one embodiment, the request may be authenticated by authentication server 1006. In this example, a dealer requesting chips may be required to provide authentication information to ensure that the chips are being requested by a dealer at a black jack table and not a thief trying to steal the chips. In another embodiment, the request may be automatically generated by gaming support appliance, such as gaming support appliance 110 in FIG. 1. Thus, authentication of the gaming support appliance may be performed by authentication sever 1006. Authentication may be completed by any known means such as fingerprint reader, employee card reader, eye scanner, facial and/or voice recognition devices, password log-in information, and the like.

Once authentication of the dealer and/or gaming support appliance is completed, the request can cause a voucher request for the chips to be transmitted to accounting and voucher server 1024. Accounting and voucher server 1024 may generate a voucher for the chips. The vouchers may be physical (e.g., paper) or digital vouchers.

The order fulfillment server 1004 may transmit the request to inventory services server 1008 to notify a proper gaming environment department of the request. In this example, the inventory services server 1008 may notify a gaming establishment cashier of the request for additional chips. Inventory services sever 1008 may store an inventory of chips and/or other necessary gaming paraphernalia (i.e., cards, money, and the like) that is housed in each location within the gaming environment. Therefore, obtaining the necessary items will be efficient and loss of the items (e.g., supplies) may be tracked. For example, an attendant would be directed to go to a cashier cage that has enough chips to fulfill the request.

Additionally, the order fulfillment server 1004 may determine the location of the black jack table from location server 1014. Location server 1014 may store a map of a gaming environment as well as location information for each of its gaming apparatuses 1038, 1040, 1034a and 1034b. Once the location of the black jack table is determined, an efficient and timely route to deliver the chips may be determined from route services 1010. This allows for timely service for the table to receive the chips, efficient use of an attendant's (i.e., gaming environment employee's) time, and ensure that no chips or monies are lost along the way. Route services 1010 may also store a map of the gaming environment and/or utilize the map of the gaming environment from location server 1014. Route services may then plan or map out an efficient route for the attendant to obtain and deliver the requested chips, which may cover the events such as pick up of a voucher, deliver the voucher to the cashier's cage in exchange for chips, and provide them to the appropriate table.

Messaging/dispatching services server 1012 may be similar to notification system 122 discussed with reference to FIG. 1. Messaging/dispatching services server 1012 may determine and schedule an attendant that is available to perform the services. This ensures that the gaming employees or attendants are not idle and will always have a task to complete. In this regard, messaging/dispatching services server 1012 may work with scheduling server 1020 to determine which attendant is working, which location the attendant is working at, and whether the attendant is on a break. In one example, scheduling server 1020 may determine that Attendant A is working from 9 am-12 pm with a break between 10 am-10:15 am. Scheduling server 1020 may also determine that Attendant A is working as a dealer at table 2 at 9 am and then at table 5 at 10:15 am.

Referring back to the example above, messaging/dispatching services server 1012 may be aware that the selected attendant is needed to be able to pick-up a voucher and present it to the nearest location housing the chips. The request for additional chips, along with an efficient route, may be presented on a computing device associated with the attendant, such as a portable computing device or smart phone, via attendant services server 1002. Attendant services server 1002 may manage which computing device is associated with which attendant as well as which attendant is able to complete which service.

In one embodiment, the location of the attendant may be tracked by location server 1014 and/or real-time activity tracking display 1026. Real-time activity tracking display

1026 may be in communication with gaming device 1038, kiosk 1040, and/or eTable 1034a-1034b to provide and present a visual display of the location of the attendant and also the chips being delivered by attendant. In other words, the dealer may see, via real-time activity tracking display 1026, when the attendant leaves the table, arrives at the cashier cage, leaves the cashier cages, and the route that is used to deliver the chips to the table.

Assuming an embodiment using vouchers, the attendant may pick-up the voucher at the table, such as a Black Jack table. In one embodiment, prior to receiving the voucher, the attendant may need to be authenticated by authentication server 1006. For example, the attendant may need to input authentication information into a computing device, such as a logistic management server or a gaming support appliance. This is to ensure that the voucher is being picked-up by a legitimate gaming environment employee and not a thief.

The attendant may thereafter present the voucher at a cashier's cage or any other location where the chips may be obtained. The voucher may be exchanged for the chips, which may be delivered to the black jack table following the efficient and timely route planned out by route services 1010. Once at the black jack table, the dealer and attendant may, in one embodiment, both again be authenticated by authentication server 1006 to ensure the chips are delivered to the proper location and/or persons.

Upon delivery and completion of the request, attendant, dealer, and/or both persons may submit a completion notification to transaction database 1016. Transaction database 1016 may be coupled to the order fulfillment server 1004 via fulfillment network 1036. The transaction database 1016 can provide storage for transaction data (e.g., records) associated with fulfillment of services, requests, or re-supplies to various gaming apparatus. The transaction data can provide a transaction log. The transaction data can be stored at the transaction database 1016 and can be utilized for ensuring that all transactions are carefully monitored and recorded for future review, audit, and the like.

In another example, a customer may want to order a beer while playing a wagering game of chance at a gaming device 1038 or eTable 1034a-1034b. The request for the beer, in one embodiment, may be entered by the customer into the gaming device 1038, kiosk 1040, or eTable 1034a-1034b. The request may be transmitted to order fulfillment server 1004. In yet another example, a customer may notice a spill on the gaming establishment floor and report the spill at a gaming device 1038 or kiosk 1040. The report may then be transmitted to order fulfillment server 1004 to request someone to clean it up.

The kiosk 1040 could also be a gaming supply kiosk that can house and dispense gaming supplies at location were the kiosk 1040 is provided. One or more gaming supply kiosks can be distributed around a gaming establishment. In response to a request for chips by a particular gaming table, route services may then plan or map out an efficient route for an attendant to obtain and deliver the requested chips, which may cover events such as pick up of a voucher, deliver the voucher to a designated gaming supply kiosk in exchange for chips, and provide them to the particular gaming table. The gaming supply kiosk can include packages of chips or prepared chip trays that can be dispensed to an attendant once the attendant provides a voucher and/or identification/authentication to the gaming supply kiosk.

When order fulfillment server 1004 receives a request, the request may then be transmitted to the appropriate server. For example, a request for a drink may be transmitted to the food and beverages service server 1030. The food and beverage service server 1030 may manage who and how the drink will be delivered to the customer. Upon receipt of the request, the food and beverage service server 1030 may determine the location of the customer from location server 1014. Location server 1014 may store a map of the gaming environment as well as location information for each of its gaming apparatuses 1038, 1040, 1034a-1034b. Once the location of the customer is determined, food and beverages services 1030 may communicate with route services 1010 to determine the most efficient and fastest route for an attendant to take to deliver the drink. This allows for timely service to the customer and efficient use of an attendant's (i.e., gaming environment employee's) time. Route services 1010 may also store a map of the gaming environment and/or utilize the map of the gaming environment from location server 1014. Route services may then plan or map out an efficient route for the attendant to use to reach the customer requesting the drink.

Once the most efficient and timely route is determined, the request, including the efficient and timely route, may be transmitted to messaging/dispatching services server 1012. In one embodiment, messaging/dispatching services server 1012 may be similar to notification system 122 discussed with reference to FIG. 1. Messaging/dispatching services server 1012 may determine and schedule an attendant that is available to prepare and deliver the drink to the customer. The request, along with the efficient and timely route, may be presented on a computing device associated with the attendant, such as a portable computing device, via attendant services server 1002. Attendant services server 1002 may manage which computing device is associated with which attendant as well as which attendant is able to complete which service. The attendant, upon receiving the request, may then prepare the drink and deliver it following the efficient and timely route.

In one embodiment, the location of the attendant may be tracked by location server 1014 and/or real-time activity tracking display 1026. Real-time activity tracking display 1026 may be in communication with gaming device 1038, kiosk 1040, and/or eTable 1034a-1034b to provide and present a visual display of the location of the drink. In other words, the customer at gaming device 1038 may see, via real-time activity tracking display 1026, when the drink exits the food and beverage location and the location of the attendant in route towards the customer.

Upon delivery of the drink and completion of the request, attendant may submit a completion notification to transaction database 1016. Transaction database 1016 may be coupled to the order fulfillment server 1004 via fulfillment network 1036. The transaction database 1016 can provide storage for transaction data (e.g., records) associated with fulfillment of services, requests, or re-supplies to various gaming apparatus. The transaction data can provide a transaction log. The transaction data can be stored at the transaction database 1016 and can be utilized for ensuring that all transactions are carefully monitored and recorded for future review, audit, and the like.

As stated above, those of ordinary skill in the art will know understand and know that services and/or requests may vary from food and beverage services, gaming services, entertainment services, customer services, security services, inventory services, maintenance services, and the like. Order fulfillment server 1004 may manage each service request received. A request to help find a missing child may be transmitted to casino security services 1022. A request to clean up a spill may be transmitted to maintenance services server 1028. Request for concert tickets may be transmitted to concierge services server 1032. A request for a player tracking card replacement may be transmitted to player tracking services 1018.

Whatever the request, it may be transmitted to the proper server to fulfill the request by order fulfillment server 1004. When transmitted to the proper server, location server 1014 and route services server 1010 may be used to determine the most efficient, quickest, and fastest route for an attendant to use to fulfill the request. Authentication server 1006 may also be used to authenticate the attendant, gaming personnel (i.e. dealer, pit managers, cashier cage managers, and the like) to ensure nothing is stolen. Messaging/dispatch server 1012 may manage and determine which gaming personnel is best able to fulfill the request. This ensures that the gaming employees or attendants are not idle and will always have a task to complete. Attendant services 1002 may manage the devices associated with each attendant to ensure that the notifications are transmitted to the proper attendant that is able to complete the tasks and requests. Finally, each transaction, (e.g., route taken by the attendant, time of completion, and the like) may be stored in transaction database 1016.

Figure 11:
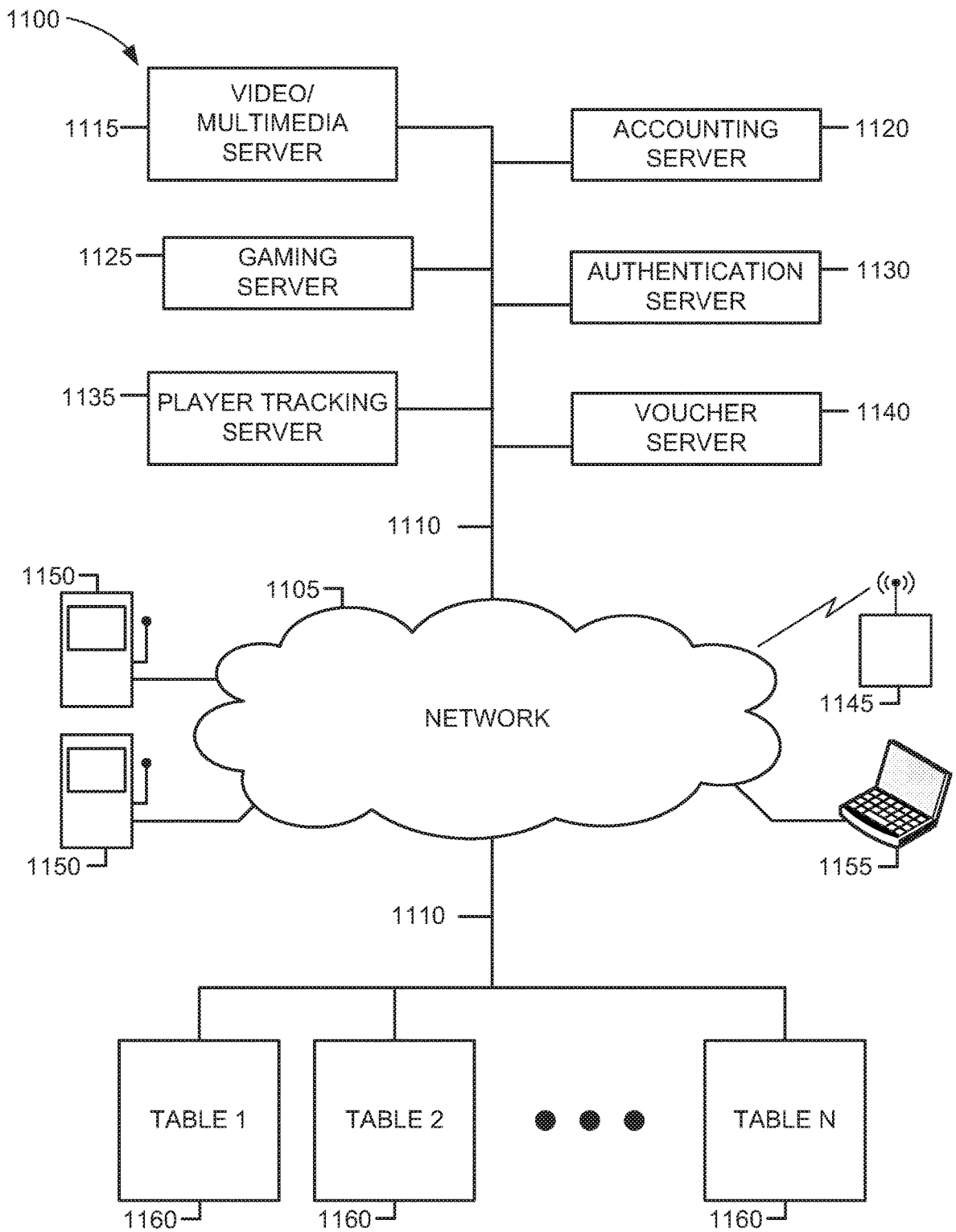
FIG. 11 illustrates an electronic gaming system according to one embodiment.

FIG. 11 illustrates an electronic gaming system 1100 according to one embodiment. The electronic gaming system 1100 may include electronic gaming tables 1160, which may be coupled to a network 1105 via a network link 1110. The electronic gaming tables 1160 may be gaming tables with enhanced electronic capabilities. The network 1105 may be or include one or more of a public and a private network. One or more video streams may be received at a video/multimedia server 1115 from the gaming tables 1160. The video/Multimedia server 1115 may transmit one or more of these video streams to a mobile device 1145, a gaming device 1150, a laptop 1155, and/or any other remote electronic device. The video/Multimedia server 1115 may transmit these video streams via network link 1110 and network 1105.

The electronic gaming system 1100 may include an accounting/transaction server 1120, a gaming server 1125, an authentication server 1130, a player tracking server 1135, and a voucher server 1140.

The accounting/transaction server 1120 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. The accounting/transaction server 1120 may generate tax information relating to these wagers. The accounting/transaction server 1120 may generate profit/loss reports for predetermined gaming options, contingent gaming options, predetermined betting structures, and/or outcome categories.

The gaming server 1125 may generate gaming options based on predetermined betting structures and/or outcome categories. These gaming options may be predetermined gaming options, contingent gaming options, and/or any other gaming option disclosed herewith.

The authentication server 1130 may determine the validity of vouchers, players' identity, and/or an outcome for a gaming event.

The player tracking server 1135 may track a player's betting activity, a player's preferences (e.g., language, drinks, font, sound level, etc.). Based on data obtained by the player tracking server 1135, a player may be eligible for gaming rewards (e.g., free play), promotions, and/or other awards (e.g., complimentary food, drinks, lodging, concerts, etc.).

The voucher server 1140 may generate a voucher, which may include credit data or data relating to gaming options. For example, a voucher can be provided that represent a credit value and can be redeemed for game play or cash out. As another example, data relating to the structure (e.g., 6 out of the next 10 rolls at craps table 4 will be a 7 or 11) may be generated. If there is a time deadline, that information may be generated by the voucher server 1140. Vouchers may be physical (e.g., paper) or digital.

Figure 12:
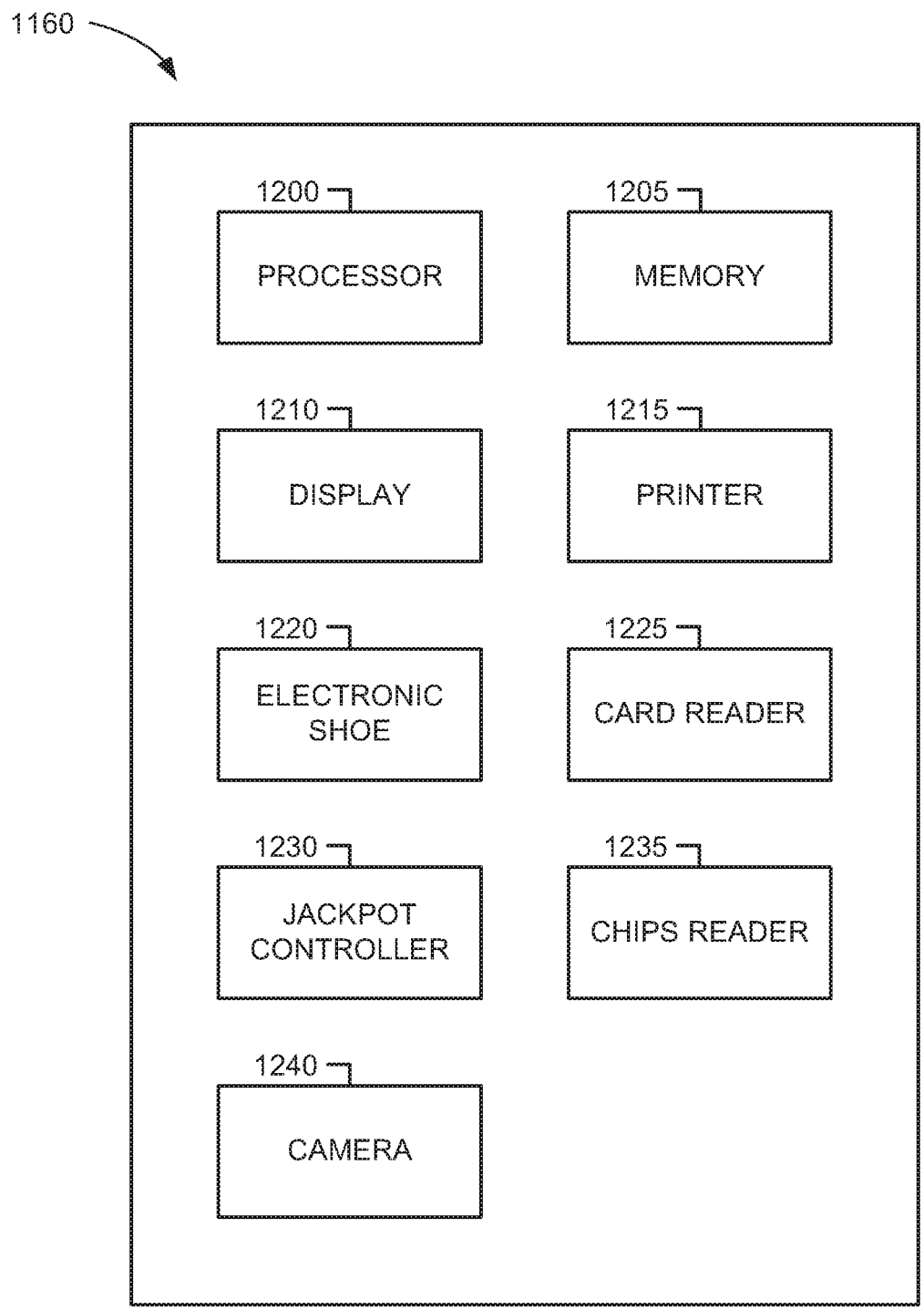
FIG. 12 illustrates an electronic gaming table with various features, according to one embodiment.

FIG. 12 shows electronic gaming table 1160 with various features, according to one embodiment. The electronic gaming table 1160 may include a processor 1200, a memory 1205, a display 1210, a printer 1215, an electronic shoe 1220, a card reader 1225, a jackpot controller 1230, a chips reader 1235, and a camera 1240.

The processor 1200 may be communicatively coupled to any other device in the electronic gaming table 1160. The processor 1200 via an interface may communicate, wired or wireless, with any of the elements of the electronic gaming system 1100.

The memory 1205 may include data relating to gaming events, video streams transmitted from the electronic gaming table 1160, winning and losing percentages for gaming options relating to the electronic gaming table 1160, and game management data (e.g., dealer schedule, chip refills, etc.).

The display 1210 may show previous game results, a betting structure, outstanding bets, transaction volume, present value of betting options, a table minimum bet, a table maximum bet, or any other video data.

The printer 1215 may generate vouchers, promotional items, food tickets, event tickets, chip/cash vouchers, card vouchers and/or lodging tickets. Vouchers may be physical (e.g., paper) or digital.

The electronic shoe 1220 may obtain data and/or images of gaming objects utilized with gaming table 1160. This data and/or images may be transmitted to electronic gaming devices and displayed as images from table games. For example, on a blackjack table a ten of spades may be dealt to a player. This information is obtained via the electronic shoe 1220 and utilized to generate an image and/or illustration of a ten of spades card by electronic gaming system 1100, which maybe shown as images from table games displayed at gaming tables 1160 and/or mobile device 1145, a gaming device 1150, a laptop 1155. In another example, electronic shoe 1220 may receive data relating to the numbers on dice, transmit this data to electronic gaming system, which may be utilized to generate an image/illustration of the dice by electronic gaming system (e.g., images from table games displayed at gaming tables 1160 and/or mobile device 1145, a gaming device 1150, a laptop 1155.).

The card reader 1225 may provide identification, authentication, and application processing functions. The card reader 1225 may interface with smart cards, magnetic striped card, bar code reader, RFID card, and the like.

The jackpot controller 1230 may track and compile data associated with a jackpot. The jackpot controller 1230 may award the jackpot on a specific occurrence (e.g., dealing a royal flush) and/or randomly award a jackpot.

The chips reader 1235 may compile and track data associated with the amount of chips one or more players possesses, the amount of chips won/lost at the gaming table 1160, the amount of chips in the dealer's rack at the gaming table 1160, an amount of chips bet by one or more players, amount of chips in the betting pool, and/or any combination thereof.

The camera 1240 may obtain data from the gaming table 1160. The camera 1240 may be one or more cameras located to view the gaming objects (e.g., cards, dice, dominos, ball, wheel, etc.), the dealer, the shoe, the players' hands, the players, and/or any combination thereof. The camera 1240 may transmit this data to the gaming table 1160, which may be utilized to generate an image/illustration of the gaming objects.

As discussed herein, a fulfillment system, such as the gaming fulfillment system 100, may be applied in a live table system that monitors a live table game in which physical or virtual cards are dealt to one or more players at a gaming table, or other physical game components are employed such as dice, and collects the randomly generated game play data. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal may be stationary, similar to the slot machines or electronic tables commonly seen at the physical casino, or may be portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. It should be appreciated that players interested in placing wagers on a live-table game not be confined to the gaming table or even the casino floor.

Figure 13:
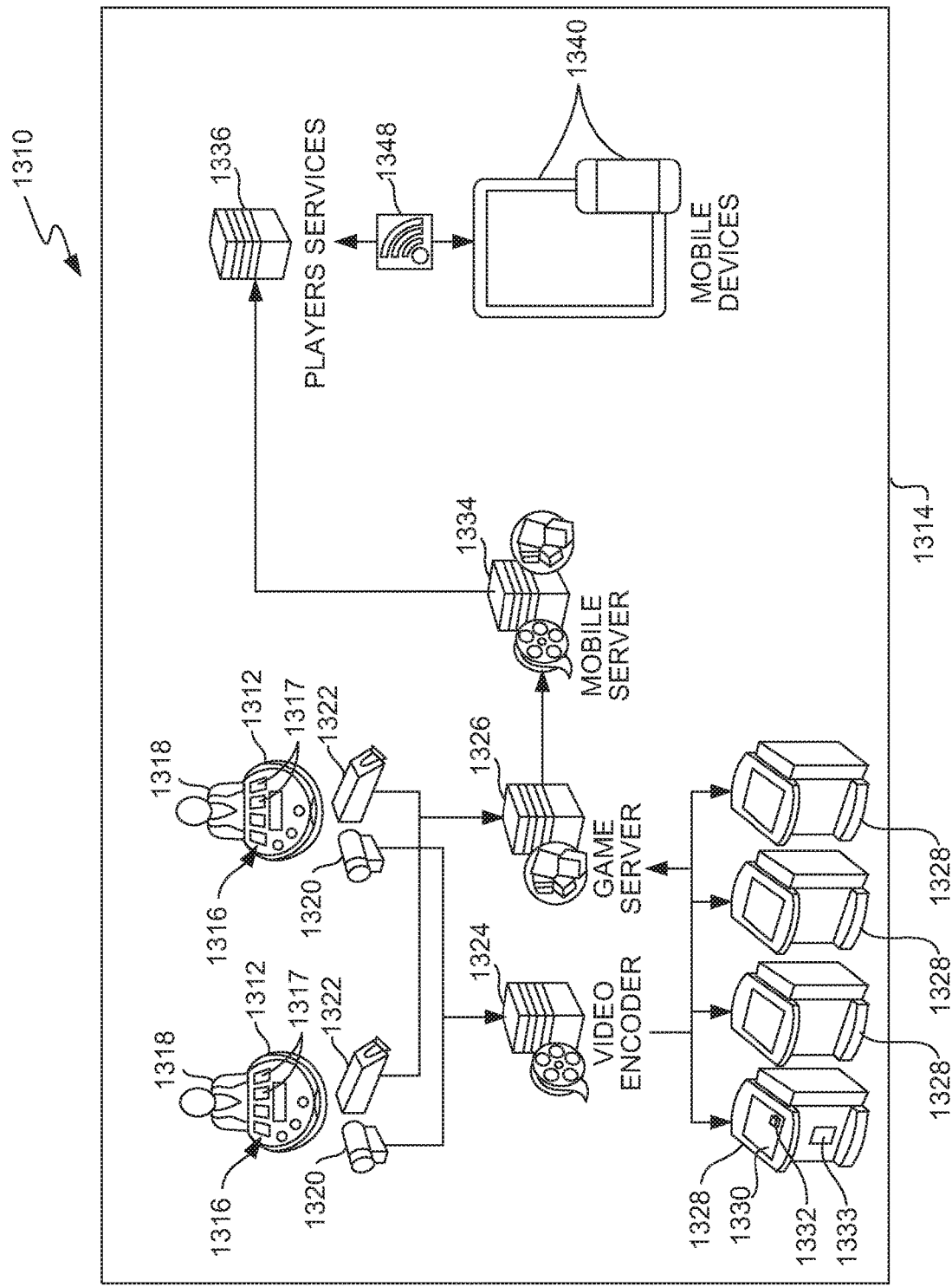
FIGS. 13 and 14 illustrates one embodiment of a system for providing multiple synchronous games for multiple plays from a live table game.
Figure 14:
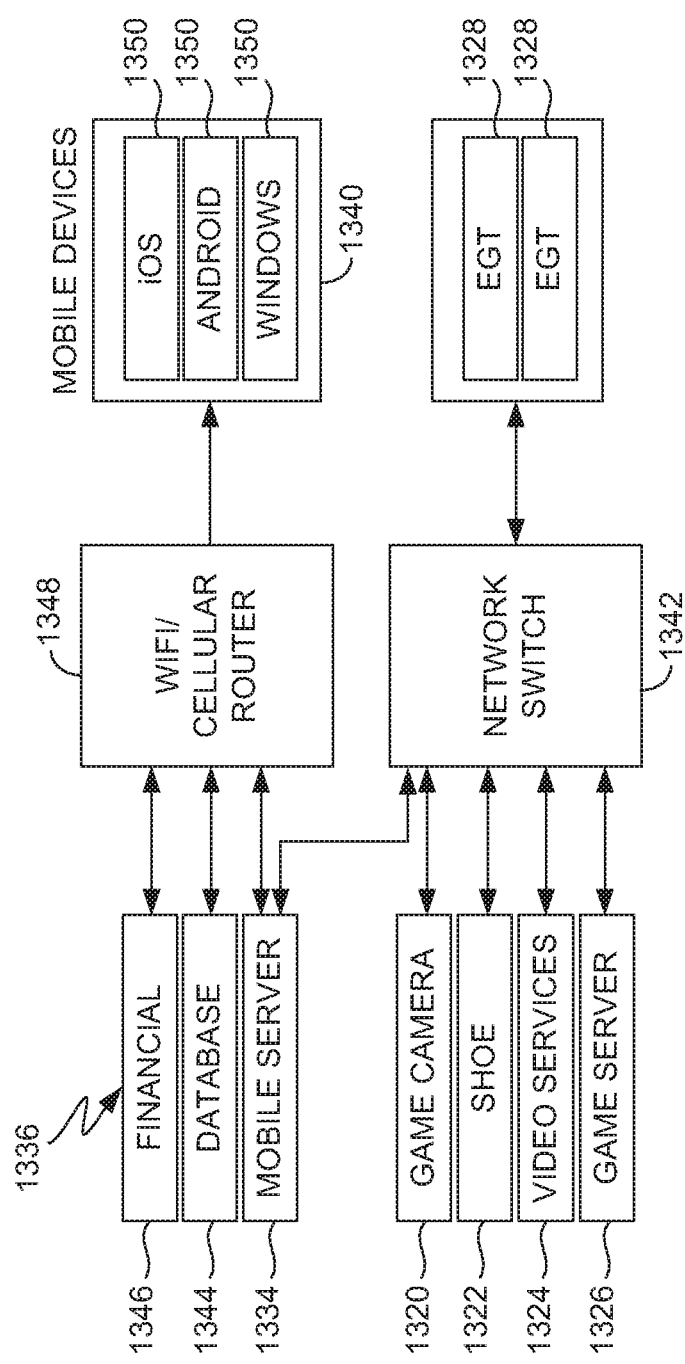

FIGS. 13 and 14 illustrate one embodiment of a system 1310 for providing multiple synchronous games for multiple plays from a live table game. In the illustrated embodiment, the system 1310 includes at least one physical game table 1312 located in a live play area or gaming space such as a casino 1314. The system 1310 also includes a physical game system, generally indicated at 1316, for playing a live table game in connection with the physical game table 1312 to generate a single live game data sequence by a live dealer 1318 operating the physical game system 1316. In one embodiment, the system 1310 may include one or more physical game tables 1312, one or more physical game systems 1316, and one or more live dealers 1318. The physical game system 1316 includes as least one of the following: (i) an electronic card shoe, a shoe controller, a plurality of physical cards, a dealer display, and a network interface for a card game; (ii) a wheel, a controller, a ball, a ball drop sensor, a dealer display, and a network interface for a roulette game; (iii) a set of dice, a controller, a dealer display, and a network interface for a dice game; and/or (iv) a plurality of spinning reels, a controller, a dealer display, and a network interface for a slot game. In the embodiment illustrated, the physical game system 1316 includes a plurality of physical cards 1317 for a card game such as Baccarat and an electronic card shoe 1322. It should be appreciated that the physical cards 1317 are shuffled and loaded into the electronic card shoe 1322 for dealing to play the card game. It should also be appreciated that one live dealer 1318 may operate one or more live table games on the physical game table 1312 in connection with one or more physical game systems 1316, each physical game system 1316 generating a single live game data sequence. For example, a physical game table 1312 may have two physical game systems 1316, such as, an electronic shoe system 1322 for a card game, and an electronic roulette wheel system (not shown) for a roulette game. Both the card game and the roulette game systems may be operated by the same live dealer 1318, such as in an alternating manner. It should further be appreciated that the live game data sequence is, for one example, the order in which the physical cards 1317 are dealt or, for another example, the spinning of the roulette wheel, dropping the ball on the wheel, and the ball finally resting on one spot of the wheel. Specific components of the system 1310 may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system 1310 may be programmed and configured to implement one or more embodiments described herein. It should also be appreciated that the various aspects of the system 1310 may be exemplified as software, modules, nodes, etc. of a computer or server.

Referring to FIGS. 13 and 14, the system 1310 also includes at least one camera 1320 for recording video of the single live game data sequence generated by the physical game system 1316. In the embodiment illustrated, there are two cameras 1320 with one camera 1320 for each live dealer 1318. The camera 1320 may be positioned in a variety of locations to capture all the gaming activity occurring at the physical game table 1312, the dealer 1318 playing the physical game system 1316 in connection with the game table 1312, or just the hands of the dealer 1318 playing the physical game system 1316 in connection with the game table 1312. For example, the camera 1320 may be situated above the game table 1312, pointed toward the dealer 1318, or placed inside or under a rim of the game table 1312 and directed toward the center of the table 1312 (to capture a dealt card that is viewed by the dealer 1318). In another embodiment, multiple cameras 1320 may be used, each focusing on one aspect of the physical table game 1312. For example, one camera 1320 may be positioned to capture the live dealer 1318, another camera 1320 may be pointed at the electronic card shoe 1322, and yet another camera 1320 may be zoomed in to the dealt cards on the physical game table 1312. Each camera 1320 records a live video feed of game-play at the game table 1312, which is transmitted over a network shown in FIG. 14. The live feed may include a digital or analog signal representing gaming action captured by the camera 1320. It should be appreciated that the camera 1320 provides a live broadcast of the game actions at the physical table game 1312 to the one or more electronic gaming terminals (EGTs) 1328. It should also be appreciated that this video stream is normally for informational purposes only (e.g., the players can verify that the dealer operate the game correctly). It should still further be appreciated that a more detailed description of a live dealer game is disclosed in U.S. Pat. No. 8,348,763, the entire disclosure of which is hereby expressly incorporated by reference.

The system 1310 includes at least one of a video encoder and/or a video transcoder 1324 in communication with the at least one camera 1320. In the embodiment illustrated, there is one video encoders/transcoders 1324 in communication with the two cameras 1320, one video encoder/transcoder 1324 being associated with one camera 1320 for each live dealer 1318. It should be appreciated that the video encoder/transcoder 1324 encodes the digital video from the camera 1320 to meet proper formats and specifications for recording and broadcasting through the use of video broadcasting systems.

The system 1310 also includes a game server 1326 in communication with at least one physical game system 1316 to receive the single live game data sequence and generate multiple synchronous games from the single live game data sequence. In one embodiment, the game server 1326 includes a processor 1327*a* and a memory 1327*b* for storing rules, logic, and payout tables of the multiple synchronous games and applies the rules, logic, and payout tables to the single live game data sequence to generate the multiple synchronous games. The game server 1326 may also include a database 1344 for storing information or be coupled to a database 1344 to access information. The game server 1326 is in communication with the one or more physical game systems 1316. In the illustrated embodiment, the game server 1326 is coupled to each electronic card shoe 1322 via a communications link such as a network switch 1342 that enables communication over a network, such as, for example, the Internet, a cellular telecommunications network, a wireless network and/or any suitable communication network. It should be appreciated that the gamer server 1326 is configured to carry out the methodologies described herein. It should also be appreciated that the game server 1326 may be programmed in a suitable language to carry out the methodologies. The game server 1326 may be arranged in a variety of configurations and may include a communication interface that receives and transmits game play data which is randomly generated as a result of playing the live table game, a processor that facilitates comparing the live game data with the rules and/or criteria for winning the wagers stored in data storage and determines an outcome of the wagers placed on the live table game via a data communication device of the electronic gaming terminal 1328. The game server 1326 is configured to receive the one or more wagers on the multiple synchronous games from the one or more electronic game terminals 1328, to provide the multiple synchronous games to the one or more electronic gaming terminals 1328 synchronously, to determine the results or outcomes of the multiple synchronous games, to resolve the one or more wagers on the multiple synchronous games synchronously from the one or more electronic game terminals 1328, and to payout rewards on the multiple synchronous games to the one or more electronic game terminals 1328. It should be appreciated that the game server 1326 may perform functions described below by executing computer-readable program instructions stored in data storage to enable a plurality of electronic gaming devices to each play a separate instance of one or more live dealer games, to determine the outcome of game-play decisions and game results at a live dealer game, to transmit the game results to one or more electronic gaming terminals 1328 to be described, to operate in conjunction with a larger online gaming system (e.g., a separate gaming server, an online casino website, or a web server), or to manage a remote player's credit account, for example. It should be appreciated that the electronic gaming terminal 1328 may be of the type disclosed in U.S. Patent Pub. US20160012663 A1, published Jan. 14, 2016 and U.S. application Ser. No. 14/864,334, filed Sep. 24, 2015, the entire disclosure of which is hereby incorporated by reference.

The system 1310 further includes one or more electronic gaming terminals 1328 in communication with the game server 1326. Each of the electronic gaming terminals 1328 has a display 1330 to display the multiple synchronous games from the game server 1326 and an input mechanism 1332 to input one or more wagers on the multiple synchronous games. In the illustrated embodiment, each electronic gaming terminal 1328 includes a controller 1333 that is coupled to the display 1330 and the input mechanism 1332 and a communications device (not shown). The controller 1333 receives and transmits information to and from the game server 1326 and displays the games and the graphical interfaces on the display 1330 to enable a player or user to interact with the game server 1326 to play the games in accordance with the embodiments described herein. The display 1330 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the input mechanism 1332 includes, without limitation, buttons, a keyboard, a keypad, a touch-sensitive screen, a scroll wheel, a pointing device, a barcode reader, a magnetic card reader, a radio frequency identification (RFID) card reader, an audio input device employing speech-recognition software, gestures, and/or any suitable device that enables a user to input data into the controller 1333 and/or to retrieve data from the controller 1333. It should be appreciated that a single component, such as a touch screen, a capacitive touch screen, and/or a touchless screen, may function as both the display 1330 and as the input mechanism 1332. It should also be appreciated that the display 1330 is configured to facilitate the entry of wagers, show a live multimedia feed of the table game being played and communicate the outcome of any wagers placed.

The system 1310 may include a mobile server 1334 in communication with the game server 1326 via the network switch 1342 to output the multiple synchronous games to one or more mobile devices 1340 to be described. The mobile server 1334 may be arranged in a variety of configurations and may include a processor and a communication interface that receives and transmits game play data from the game server 1326.

The system 1310 may include a player tracking server 1336 in communication with the mobile server 1134 and the one or more mobile devices 1340 to allow remote play of the multiple synchronous games and to track the remote play of the multiple synchronous games. The player tracking server 1336 provides games, accounting, and financial services for mobile players. The player tracking server 1336 may include memory for storage of a database 1344 for tracking games and player data and a financial database 1346 for storing financial data and for processing financial transactions related to the player wagering such as money transfers, deposits, withdrawals, balance monitoring, etc.

The system 1310 also may include a wireless or cellular router 1348 in communication with the mobile server 1334, player tracking server 1336, and one or more mobile devices 1340 that enables communication over a network, such as, for example, the Internet, a cellular telecommunications network, a wireless network and/or any suitable telecommunication network.

The system 1310 may further include one or more mobile devices 1340 in communication with the wireless router 1348. Each of the mobile devices 1340 has a display to display the multiple synchronous games from the game server 1326 and an input mechanism to input one or more wagers on the multiple synchronous games. The mobile device 1340 includes a processor operating system 1350 such as iOS, Android, or Windows. The processor operating system 1350 communicates with the mobile server 1334 and the player tracking server 1336 via the wireless router 1348 and the cellular telecommunications network and/or the Internet. In one embodiment, the mobile device 1340 may include a portable computer, laptop, cell phone, tablet computer, smart phone/tablet computer hybrid, personal/home video game device, personal data assistant, and/or any suitable computing device that enables a player to connect to the mobile server 1334 and the player tracking server 1336 and display the graphical interfaces.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A logistics system for management and fulfillment of gaming logistic requests, the logistics system supporting a plurality of gaming apparatus, each of the gaming apparatus configured to perform or facilitate a wager based game, and each of the gaming apparatus including or being proximate to a gaming support appliance having an electronic monitor integral or proximate thereto, the gaming support appliance maintaining physical assets that are used to facilitate the wager based game, the logistics system comprising:
a logistic management server configured to communicate with the electronic monitor of the gaming support appliance of each of the gaming apparatus, the logistic management server being configured to:
receive data from the electronic monitor;
determine, based on the data from the electronic monitor, status data for the physical assets maintained by the gaming support appliance;
electronically record the status data pertaining to the physical assets maintained by the gaming support appliance;
determine, based at least in part on the status data, whether the gaming support appliance associated with the electronic monitor needs a re-supply of the physical assets;
electronically transmit a re-supply request to a supply depository when it is determined that the gaming support appliance associated with the electronic monitor needs a re-supply of physical assets;
electronically transmit a delivery request for an attendant when it is determined that the gaming support appliance associated with the electronic monitor needs a re-supply of physical assets;
electronically record transaction information descriptive of events pertaining to the re-supply of physical assets, the events being recorded for the re-supply of a particular physical asset or assets including recordation of a plurality of intermediate events between initiation and completion of the re-supply request, the recordation of the plurality of intermediate events between initiation and completion of the re-supply request includes at least an indication of time that (i) the supply depository was notified of the re-supply request, (ii) the attendant picked-up the physical assets being re-supplied to the gaming support appliance needing the re-supply of the physical assets, and (iii) the re-supply of the physical assets to the gaming support appliance were delivered by the attendant to the gaming support appliance needing the re-supply of the physical assets; and
electronically record receipt of the re-supply of physical assets once the physical assets being requested by the re-supply request have been received at (i) the gaming support appliance associated with the electronic monitor that needed the re-supply of physical assets, or (ii) the gaming apparatus for the gaming support appliance associated with the electronic monitor that needed the re-supply of physical assets,
wherein each of the plurality of gaming apparatus is a table game and the gaming support appliance contains the physical assets used to play the table game, and
wherein the physical assets include physical gaming objects used in playing a game of chance on the table gaming apparatus.

2. The logistics system as recited in claim 1, wherein the logistics system a user logistic management terminal provided at or proximate to the gaming apparatus.

3. The logistics system as recited in claim 2, wherein a user acknowledges the receipt of the re-supply of the physical assets using the user logistic management terminal.

4. The logistics system as recited in claim 1, wherein the logistic management server comprises or couples to a transaction database, and wherein the transaction information is stored in the transaction database.

5. The logistics system as recited in claim 1, wherein the physical assets include physical gaming objects used in playing a game of chance on the gaming apparatus.

6. The logistics system as recited in claim 1,
wherein the recordation of the plurality of intermediate events between initiation and completion of the re-supply request include at least an indication of the attendant assigned for the delivery request, and
wherein the delivery request includes a delivery route for the attendant to follow in transporting the physical assets of the re-supply request to the gaming support appliance associated with the electronic monitor that needs a re-supply of physical assets.

7. The logistics system as recited in claim 6,
wherein the plurality of gaming apparatus are within a gaming establishment, and wherein the delivery route provides at least a route that is internal to the gaming establishment, and
wherein the delivery request electronically transmitted to the attendant is configured to present a graphical map on a mobile communication device associated with the attendant, the graphical map visually presenting at least the route that is internal to the gaming establishment that the attendant is to follow in transporting the physical assets of the re-supply request to the gaming support appliance associated with the electronic monitor that needs a re-supply of physical assets.

8. The logistics system as recited in claim 1, wherein the logistic management server is configured to:
determine an estimated time for delivery of the re-supply of physical assets to (i) the gaming support appliance associated with the electronic monitor that needs the re-supply of physical assets, or (ii) the gaming apparatus for the gaming support appliance associated with the electronic monitor that needs the re-supply of physical assets.

9. The logistics system as recited in claim 1, wherein the attendant has a mobile communication device, and wherein the delivery request is electronically transmitted to the attendant via the mobile communication device.

10. The logistic system as recited in claim 9, wherein the logistic management server is configured to:
receive location information pertaining to the mobile communication device associated with the attendant; and
determine an estimated time for delivery of the re-supply of physical assets to the gaming apparatus based at least in part on the location information pertaining to the mobile communication device associated with the attendant.

11. The logistics system as recited in claim 1, wherein the gaming support appliance comprises a cash box, and
wherein the electronic monitor is integrated with or operatively coupled to the cash box.

12. The logistics system as recited in claim 1, wherein the gaming support appliance comprises a chip rack, and
wherein the electronic monitor is integrated with or operatively coupled to the chip rack.

13. The logistics system as recited in claim 1, wherein the gaming support appliance comprises a card shoe, and
wherein the electronic monitor is integrated with or operatively coupled to the card shoe.

14. The logistics system as recited in claim 13, wherein the electronic monitor comprises at least one sensor.

15. The logistics system as recited in claim 1, wherein the logistic management server is configured to produce a voucher for use by the attendant in obtaining the re-supply of physical assets to be delivered to the table gaming apparatus.

16. A non-transitory computer readable medium, including at least computer program code executable by one or more computing devices, for management and fulfillment of logistic requests, said computer readable medium comprising:
computer program code for electronically receiving data from an electronic monitor of a gaming support appliance of a gaming apparatus;
computer program code for determining whether the gaming support appliance associated with the electronic monitor needs a supply of physical assets based on the received data;
computer program code for electronically directing a supply request to a supply depository when it is determined that the gaming support appliance associated with the electronic monitoring system needs a supply of physical assets;
computer program code for electronically directing a delivery request to a wireless communication device associated with an attendant when it is determined that the gaming support appliance associated with the electronic monitor needs a supply of physical assets, the delivery request instructing the attendant to deliver the supply of physical assets to the gaming apparatus; and
computer program code for electronically recording transaction information descriptive of events pertaining to the supply of physical assets, wherein the events being recorded for the re-supply of a particular physical asset or assets includes recordation of a plurality of intermediate events between initiation and completion of the delivery, the recordation of the plurality of intermediate events between initiation and completion of the delivery includes at least an indication of time that (i) the supply depository was notified of the supply request, (ii) the attendant picked-up the physical assets being supplied to the gaming support appliance needing the -supply of the physical assets, and (iii) the supply of the physical assets to the gaming support appliance were delivered by the attendant to the gaming support appliance needing the supply of the physical assets.

17. The non-transitory computer readable medium as recited in claim 16, wherein said computer readable medium comprises:
computer program code for producing a voucher for use by the attendant in obtaining the supply of physical assets to be delivered to the gaming apparatus.

18. The non-transitory computer readable medium as recited in claim 16, wherein each of a plurality of the intermediate events are time stamped.

19. A non-transitory computer readable medium, including at least computer program code executable by one or more computing devices, for management and fulfillment of logistic requests, said computer readable medium comprising:
computer program code for electronically receiving data from a gaming support appliance of a gaming apparatus;
computer program code for determining whether the gaming support appliance requests a deliverable item based on the received data;

computer program code for electronically directing a supply request to a service center when it is determined that the gaming support appliance requests the deliverable item;
computer program code for electronically directing a delivery request to a wireless communication device associated with an attendant when it is determined that the gaming support appliance requests the deliverable item, the delivery request instructing the attendant to deliver the deliverable item; and
computer program code for electronically recording transaction information descriptive of events pertaining to the supply of physical assets, wherein the events being recorded for the re-supply of a particular physical asset or assets includes recordation of a plurality of intermediate events between initiation and completion of the re-supply request, the recordation of the plurality of intermediate events between initiation and completion of the re-supply request includes at least an indication of time that (i) the supply depository was notified of the re-supply request, (ii) the attendant picked-up the physical assets being re-supplied to the gaming support appliance needing the re-supply of the physical assets, and (iii) the re-supply of the physical assets to the gaming support appliance were delivered by the attendant to the gaming support appliance needing the re-supply of the physical assets.

20. The non-transitory computer readable medium as recited in claim 19, wherein said computer readable medium comprises:
computer program code for providing a delivery route for the attendant to follow in transporting the physical assets of the supply request to the gaming support appliance associated with the electronic monitor that needs a supply of physical assets,
wherein the computer program code for electronically directing the delivery request to the wireless communication device associated with the attendant is configured to present a graphical map on the wireless communication device associated with the attendant, the graphical map visually presenting at least the delivery route that the attendant is to follow in transporting the physical assets of the supply request to the gaming support appliance associated with the electronic monitor that needs a supply of physical assets.

21. The non-transitory computer readable medium as recited in claim 20, wherein the plurality of gaming apparatus are within a gaming establishment, and wherein the delivery route provides a route that is internal to the gaming establishment.

\* \* \* \* \*